(12) United States Patent
Tandai et al.

(10) Patent No.: US 8,064,833 B2
(45) Date of Patent: Nov. 22, 2011

(54) RADIO COMMUNICATION APPARATUS AND METHOD

(75) Inventors: Tomoya Tandai, Tokyo (JP); Tazuko Tomioka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 824 days.

(21) Appl. No.: 12/046,777

(22) Filed: Mar. 12, 2008

(65) Prior Publication Data

US 2008/0287066 A1 Nov. 20, 2008

(30) Foreign Application Priority Data

May 17, 2007 (JP) ................................ 2007-131847

(51) Int. Cl.
*H04B 1/00* (2006.01)
*H04B 7/00* (2006.01)

(52) U.S. Cl. .... 455/45; 455/450; 455/452.1; 455/452.2; 370/437; 370/450

(58) Field of Classification Search .................... 455/45, 455/450, 452.1, 452.2, 509
See application file for complete search history.

(56) References Cited

U.S. PATENT DOCUMENTS

2005/0220230 A1* 10/2005 Fukuda .......................... 375/343
2007/0287464 A1* 12/2007 Hamamoto et al. .......... 455/447

FOREIGN PATENT DOCUMENTS

| JP | 2000-188583 | 7/2000 |
|---|---|---|
| JP | 2005-252219 | 9/2005 |
| JP | 2005295085 A | 10/2005 |
| JP | 2006-49715 | 2/2006 |
| JP | 2007053546 A | 3/2007 |

OTHER PUBLICATIONS

Joseph Mitola, III, "*Cognitive Radio for Flexible Mobile Multimedia Communications*", IEEE, Jun. 1999, 8 pps.
Official Action dated Sep. 15, 2009 for corresponding Japanese patent application No. 2007-131847 (with English translation).

* cited by examiner

*Primary Examiner* — Tuan H Nguyen
(74) *Attorney, Agent, or Firm* — Ohlandt, Greeley, Ruggiero & Perle, L.L.P.

(57) ABSTRACT

A radio communication apparatus which uses a first radio communication system that makes a radio communication by sharing frequencies with a second radio communication system, the apparatus includes a detection unit configured to detect an available frequency channel which fails to be used by the second radio communication system in a frequency band used by the first radio communication system, and a transmission unit configured to transmit, using the available frequency channel, a frame which includes a signal sequence which is used to identify whether or not the frame is transmitted by a radio communication terminal belonging to the first radio communication system by detecting the available frequency channel, the signal sequence being predetermined for the first radio communication system.

16 Claims, 33 Drawing Sheets

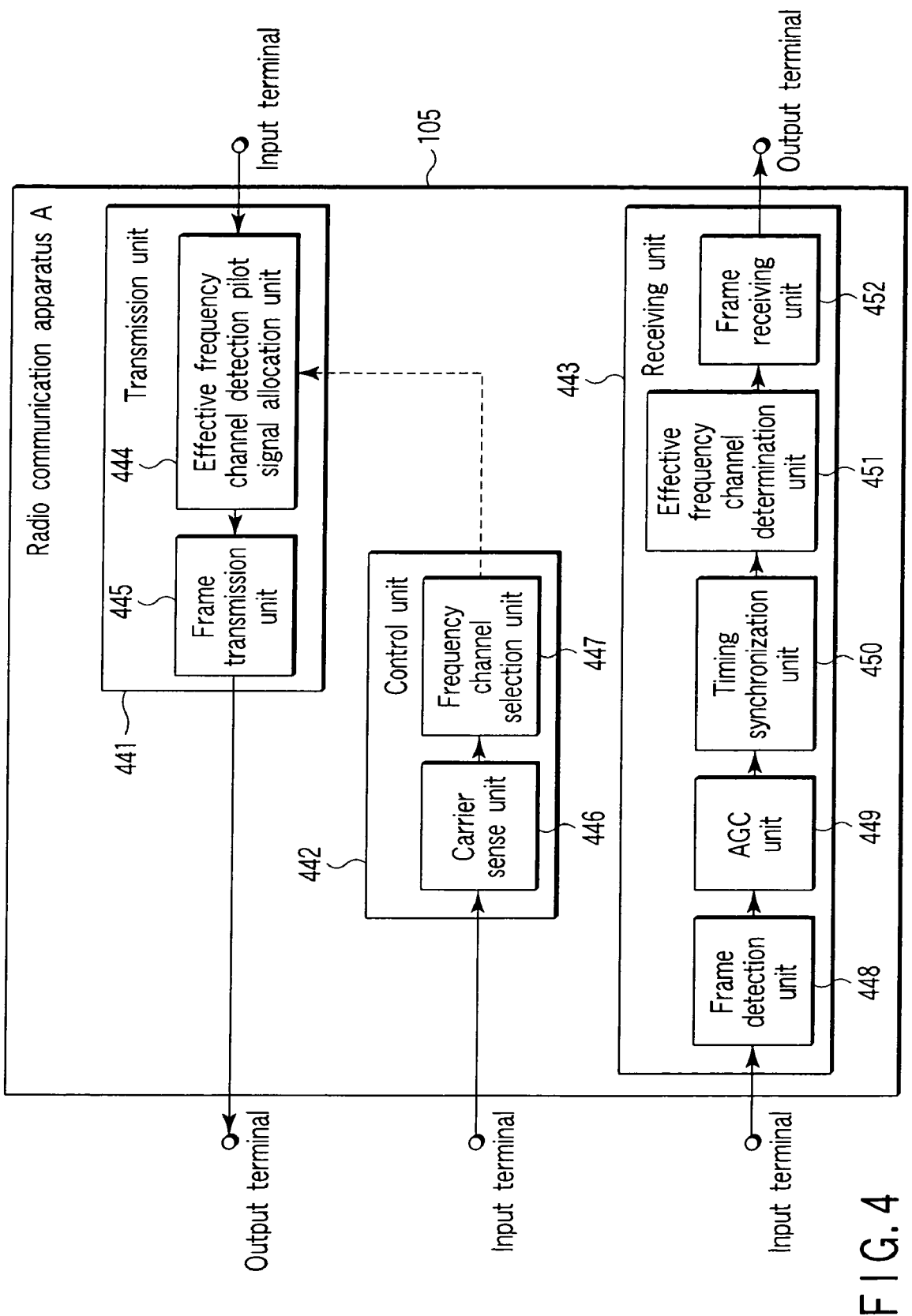
F I G. 4

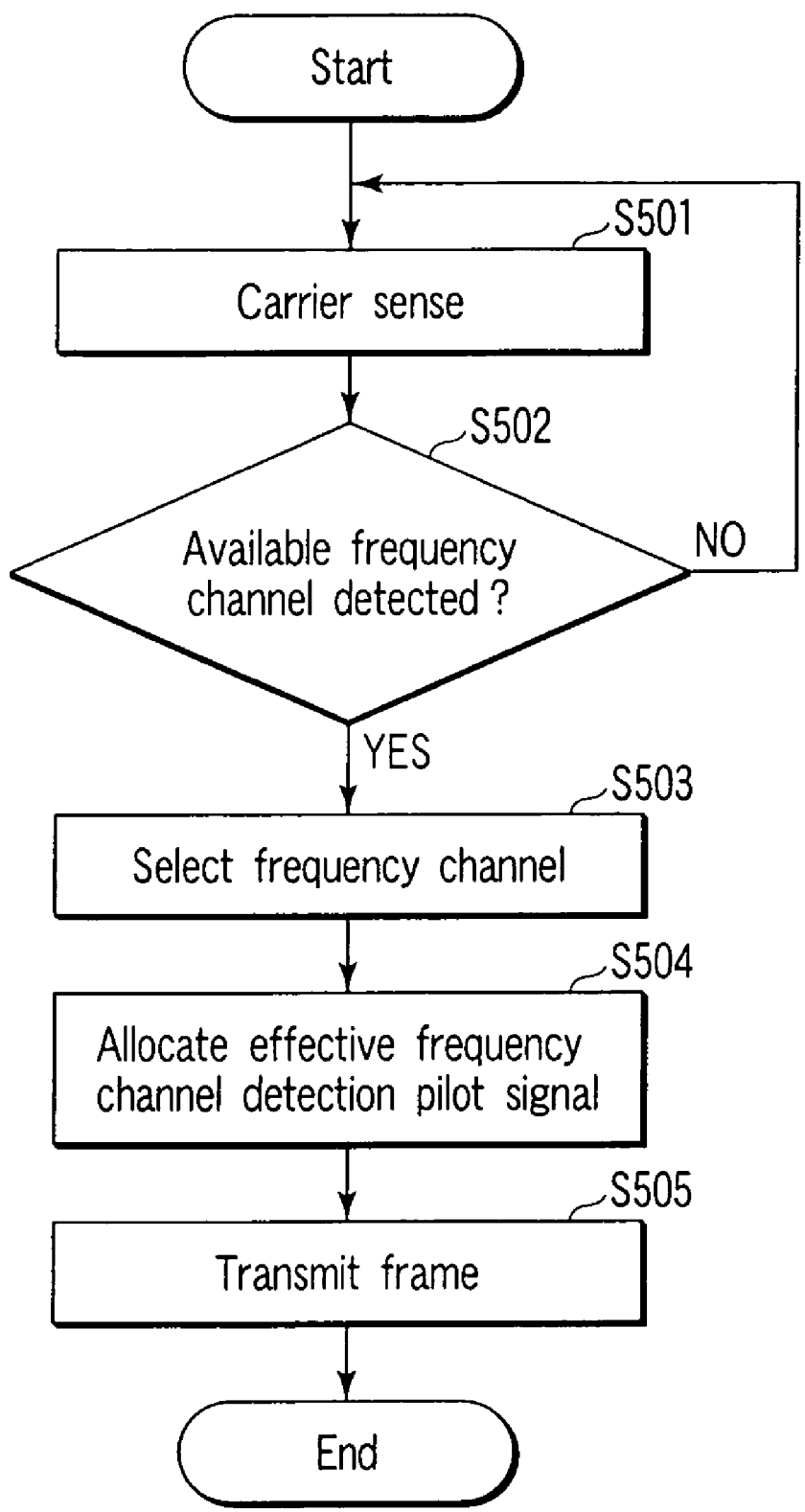
F I G. 5

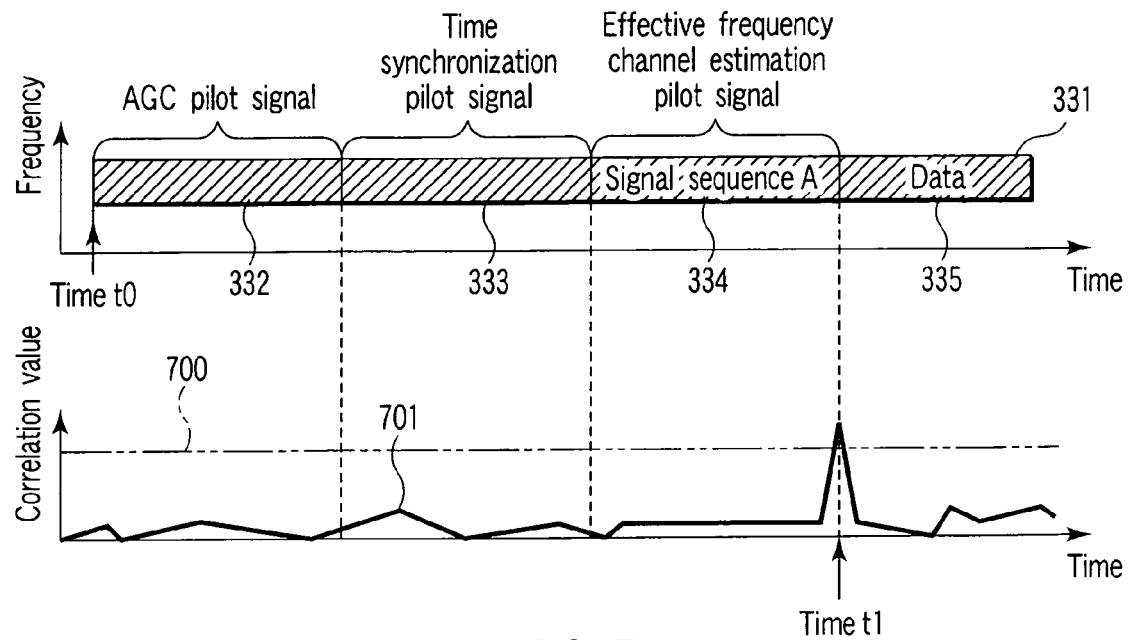
F I G. 7
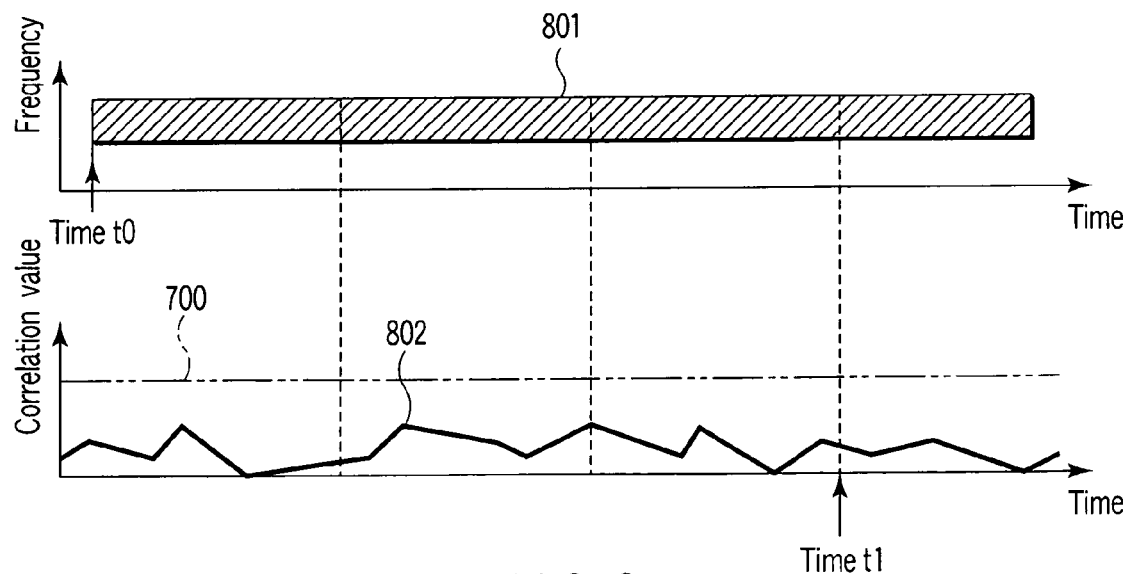
F I G. 8

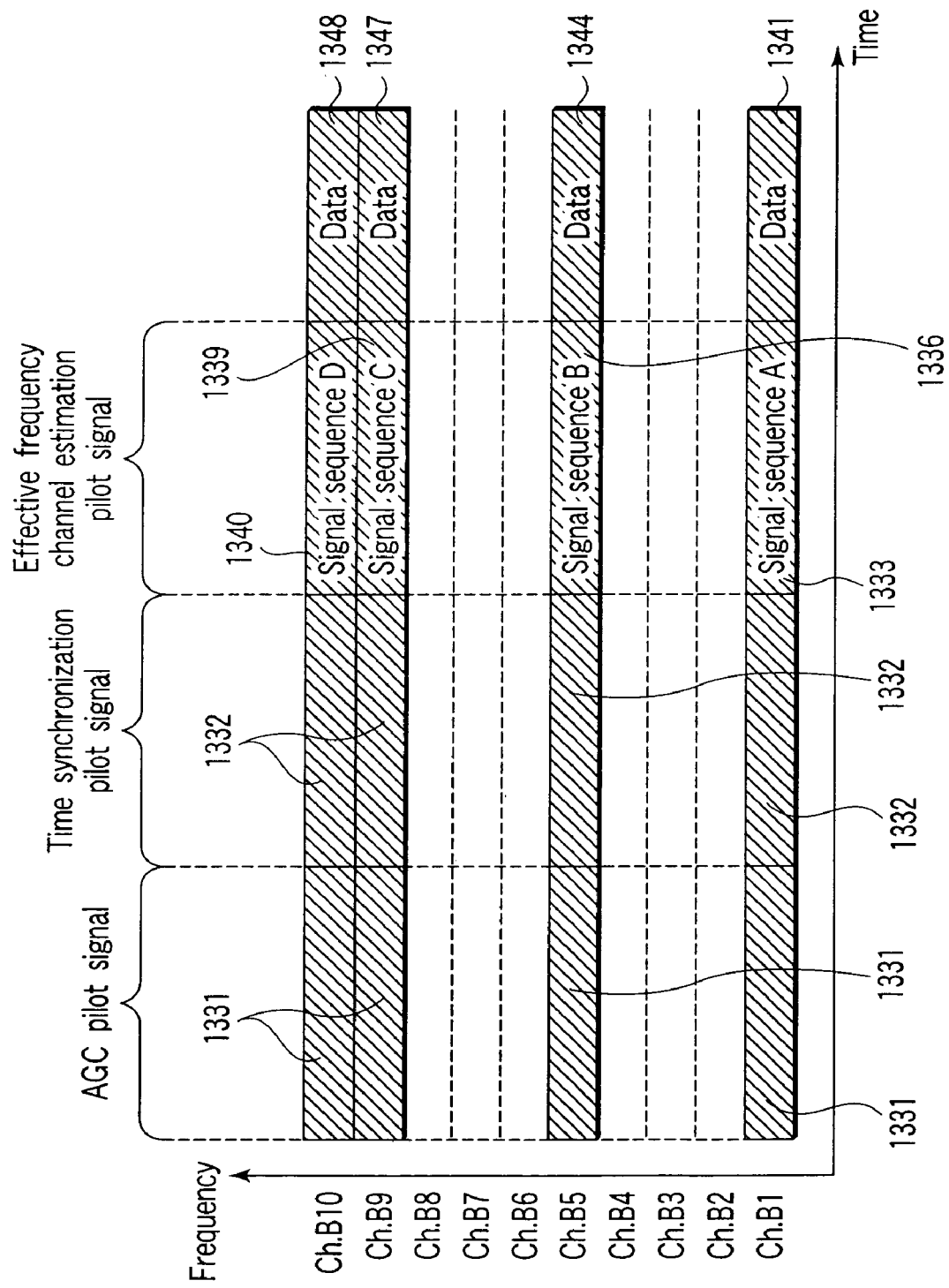
F I G. 14

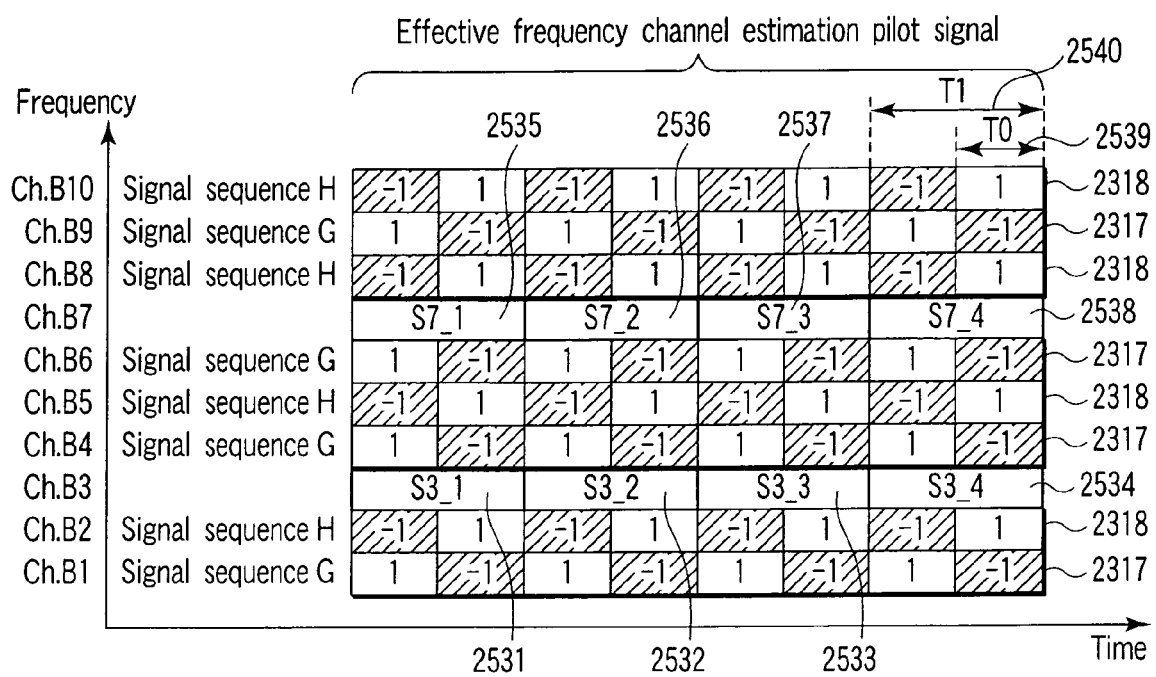
F I G. 25
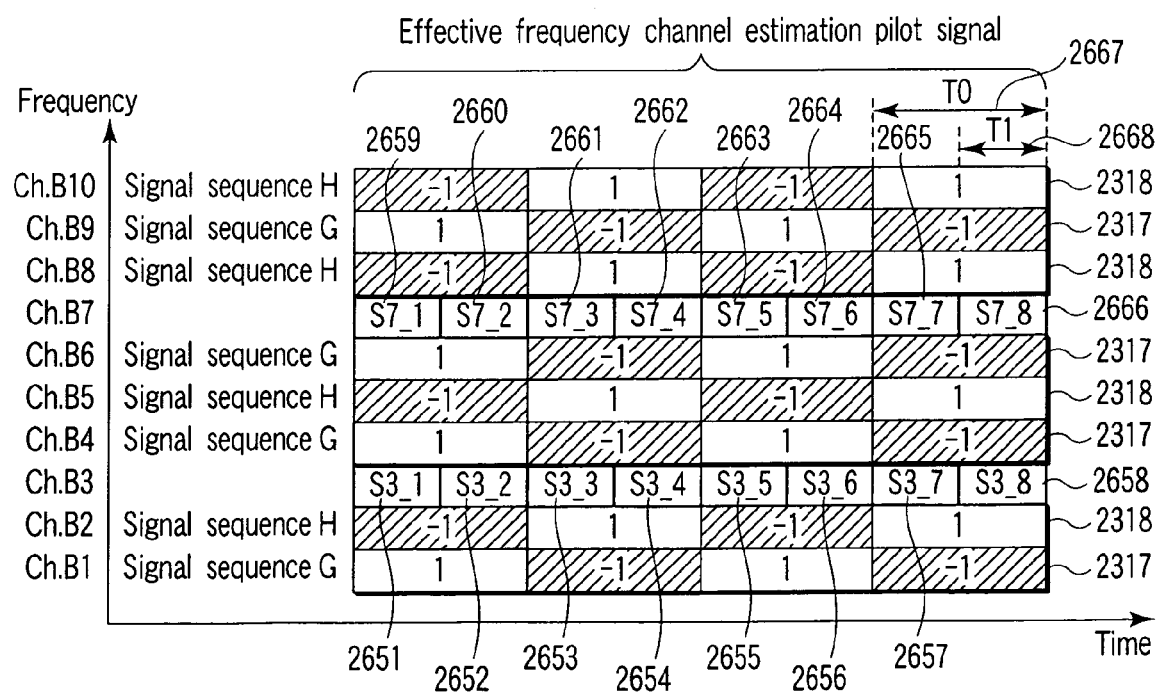
F I G. 26

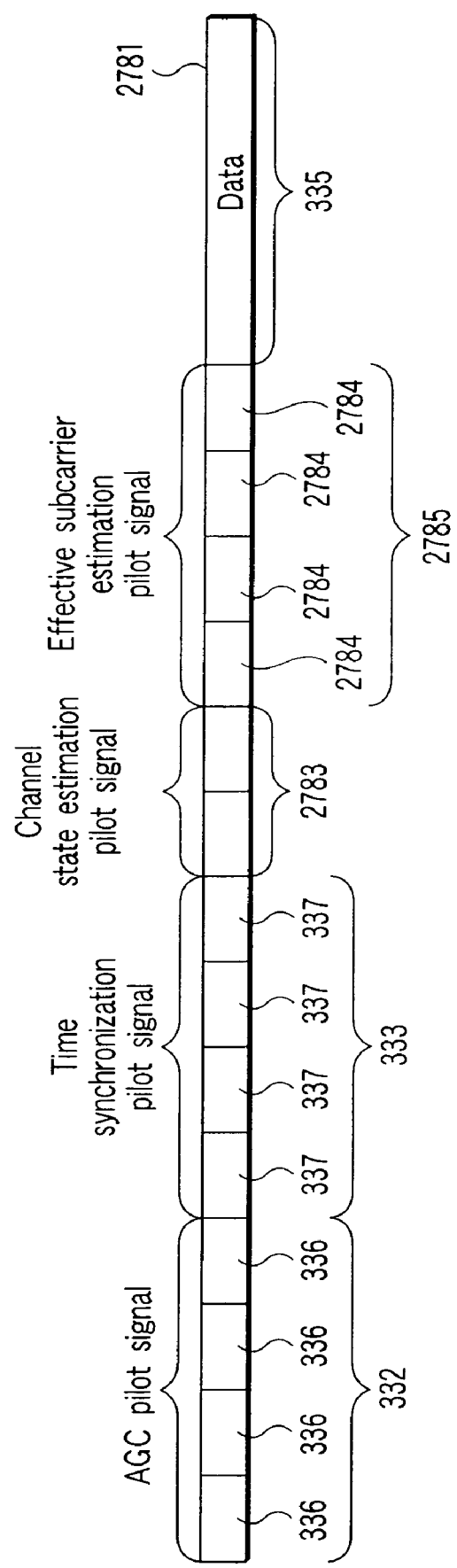
F I G. 27

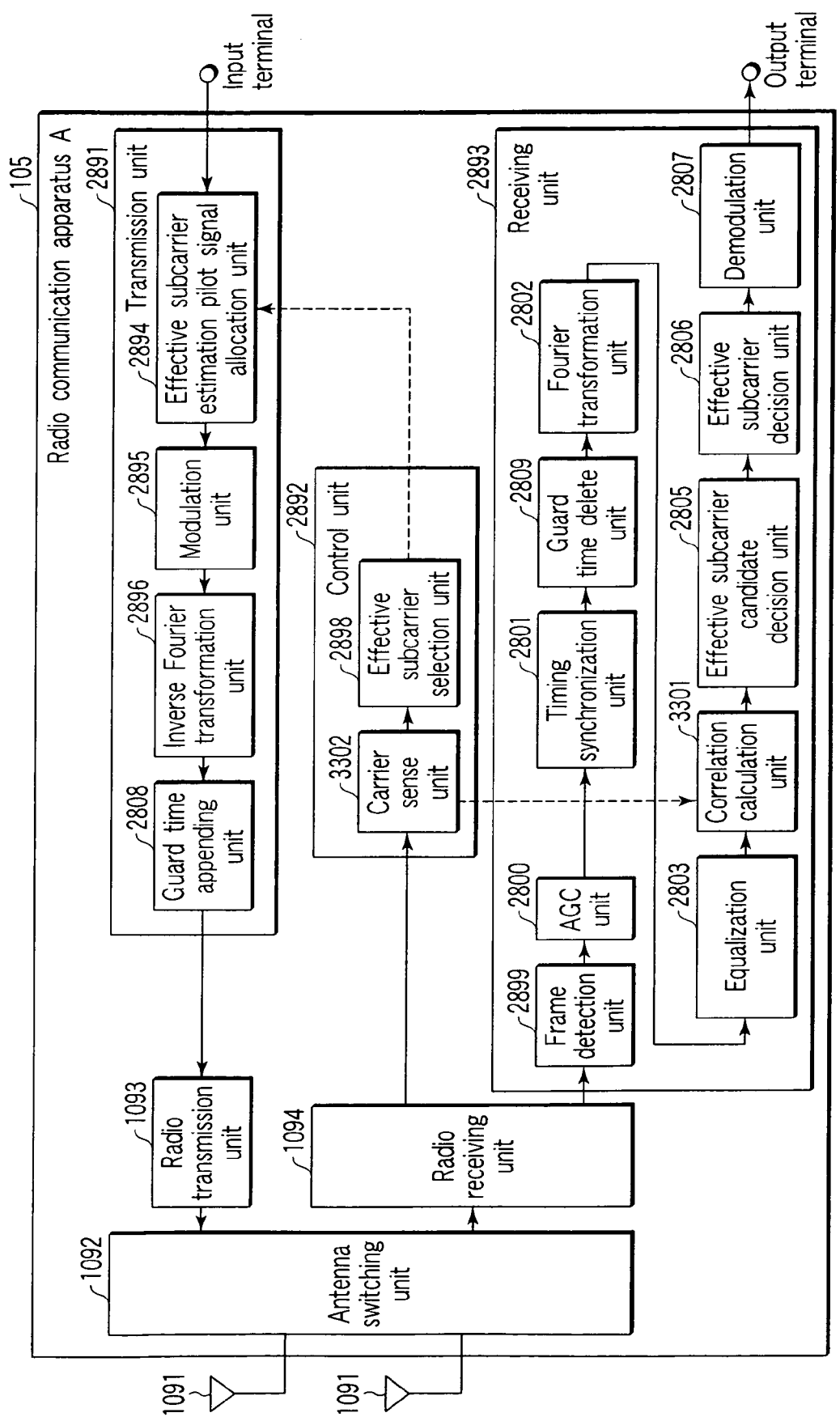
F I G. 33

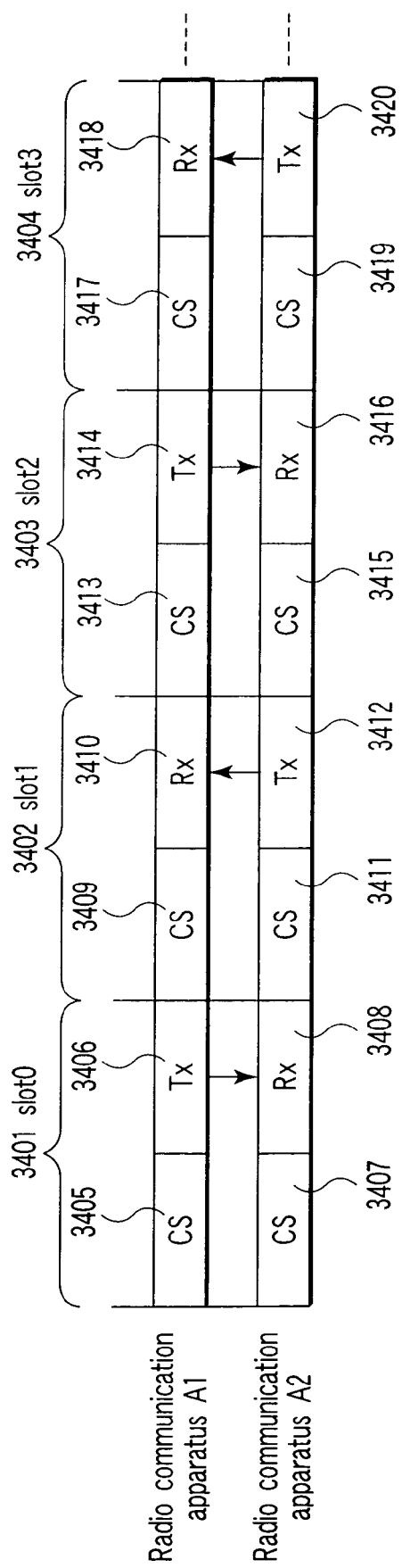
F I G. 34

RADIO COMMUNICATION APPARATUS AND METHOD

CROSS-REFERENCE TO RELATED APPLICATIONS

This application is based upon and claims the benefit of priority from prior Japanese Patent Application No. 2007-131847, filed May 17, 2007, the entire contents of which are incorporated herein by reference.

BACKGROUND OF THE INVENTION

1. Field of the Invention

The invention relates to a radio communication apparatus and a radio communication method, which allow a plurality of radio systems to share and use a frequency band.

2. Description of the Related Art

Conventionally, a radio apparatus and method which allow a plurality of radio systems to share and use a frequency band are known. In the conventional radio apparatus and method of this type, a radio apparatus with a low priority level performs carrier detection (to be also referred to as carrier sense hereinafter) of the shared frequency band, and transmits a signal when it determines that this frequency band is not used by a radio system with a high priority level (for example, see J. Mitola III, "Cognitive Radio for Flexible Mobile Multimedia Communications," IEEE Sixth International Workshop on Mobile Multimedia Communications (MoMuC99), pp. 3-10, November 1999.)

Also, in a conventional communication system that makes information transmission using transmission frames, a technique for sequentially transmitting at least two types of transmission frame detection symbols generated by orthogonal frequency division multiplex (OFDM) modulation using a plurality of frequency subcarriers in one transmission frame is known (for example, see JP-A 2000-188583 (KOKAI)).

The aforementioned related art is a technique that allows a receiving terminal to detect the transmission frame when the frequency channel used in radio communications is known in advance in transmitting and receiving terminals. Hence, the receiving terminal cannot detect the frequency channel which is selected by the transmitting terminal to transmit a transmission frame, and the frame itself, thus posing a problem.

BRIEF SUMMARY OF THE INVENTION

In accordance with a first aspect of the invention, there is provided a radio communication apparatus which uses a first radio communication system that makes a radio communication by sharing frequencies with a second radio communication system, the apparatus comprising: a detection unit configured to detect an available frequency channel which fails to be used by the second radio communication system in a frequency band used by the first radio communication system; and a transmission unit configured to transmit, using the available frequency channel, a frame which includes a signal sequence which is used to identify whether or not the frame is transmitted by a radio communication terminal belonging to the first radio communication system by detecting the available frequency channel, the signal sequence being predetermined for the first radio communication system.

In accordance with a second aspect of the invention, there is provided a radio communication apparatus which uses a first radio communication system that makes a radio communication by sharing frequencies with a second radio communication system, the apparatus comprising: a receiving unit configured to receive a frame from a radio communication terminal belonging to the first radio communication system; a gain control unit configured to control gain of the frame; a synchronization unit configured to establish timing synchronization of the gain-controlled frame to obtain a synchronized frame; a calculation unit configured to calculate a correlation value between the synchronized frame and a signal sequence which is used to identify whether or not the received frame is transmitted by the radio communication terminal by detecting an available frequency channel, the signal sequence being predetermined for the first radio communication system; and a determination unit configured to determine, when the correlation value exceeds a threshold value, that the received frame is transmitted by the radio communication terminal by detecting the available frequency channel.

In accordance with a third aspect of the invention, there is provided a radio communication apparatus which uses a first radio communication system that makes a radio communication by sharing frequencies with a second radio communication system, the apparatus comprising: a detection unit configured to detect an available frequency channel which fails to be used by the second radio communication system in a frequency band used by the first radio communication system; a selection unit configured to select, when the available frequency channel is detected, the available frequency channel as a transmission frequency channel used to transmit a transmission frame; an allocation unit configured to allocate, in a part of the transmission frame, a signal sequence which is used to identify whether or not a first frame is transmitted by a radio communication terminal belonging to the first radio communication system by detecting an available frequency channel, the signal sequence being predetermined for the first radio communication system; a transmission unit configured to transmit the allocated transmission frame using the transmission frequency channel; a receiving unit configured to receive a second frame from the radio communication terminal; a gain control unit configured to control gain of the second frame; a synchronization unit configured to establish timing synchronization of the gain-controlled frame to obtain a synchronized frame; a calculation unit configured to calculate a correlation value between the synchronized frame and the signal sequence; and a determination unit configured to determine, when the correlation value exceeds a threshold value, that the received frame is the first frame which is transmitted by the radio communication terminal by detecting the available frequency channel.

In accordance with a fourth aspect of the invention, there is provided a radio communication apparatus which uses a first radio communication system that makes a radio communication by sharing frequencies with a second radio communication system, the apparatus comprising: a detection unit configured to detect an available frequency channel which fails to be used by the second radio communication system in a frequency band used by the first radio communication system; a first decision unit configured to decide, when the available frequency band is detected, a subcarrier used to transmit a transmission frame in the available frequency band; an allocation unit configured to allocate, in a part of the transmission frame, a plurality of pilot symbols which are used to identify whether or not a frame is transmitted by a radio communication terminal belonging to the first radio communication system by detecting an available frequency band, the pilot symbols being predetermined for the first radio communication system and having different patterns for respective subcarriers; an inverse Fourier transformation unit configured to inverse Fourier transform the transmission frame including the pilot symbols; a transmission unit configured to transmit the inverse Fourier transformed transmission frame; a receiving unit configured to receive a receiving frame from the radio communication terminal; a synchronization unit configured to establish timing synchronization of the receiving frame to obtain a synchronized frame; a Fourier transformation unit configured to Fourier transform the synchronized frame; a calculation unit configured to calculate, for respective subcarriers, correlation values between the synchronized frame and all the pilot symbols; a first selection unit configured to select, for respective subcarriers, a maximum correlation value of the correlation values; a second selection unit configured to select a subcarrier, the maximum correlation value of which exceeds a threshold value, as an effective subcarrier candidate; a second decision unit configured to decide, when identifiers of the pilot symbols corresponding to the effective subcarrier candidates match an identifier pattern predetermined for the first radio communication system, the effective subcarrier candidates as effective subcarriers; and a reselection unit configured to execute, when the identifiers do not match the identifier pattern, correction processing of the effective subcarrier candidates, and to reselect effective subcarrier candidates.

BRIEF DESCRIPTION OF THE SEVERAL VIEWS OF THE DRAWING

FIG. 4 is a block diagram of a radio communication apparatus of the first embodiment;

FIG. 5 is a flowchart showing an example of processing executed when the radio communication apparatus shown in FIG. 4 transmits a signal;

FIG. 7 shows an example of correlation values when the radio communication apparatus shown in FIG. 4 receives a frame;

FIG. 8 shows an example of correlation values when the radio communication apparatus shown in FIG. 4 receives a frame;

FIG. 14 shows a second example of a frame format used in the radio communication system A including the radio communication apparatus shown in FIG. 10;

FIG. 25 shows a first example of an effective frequency channel estimation pilot signal field included in a frame of the radio communication system A in the fifth embodiment;

FIG. 26 shows a second example of an effective frequency channel estimation pilot signal field included in a frame of the radio communication system A in the fifth embodiment;

FIG. 27 shows an example of a frame format of the radio communication system A in the sixth embodiment;

FIG. 33 is a block diagram of a radio communication apparatus of the seventh embodiment;

FIG. 34 shows frame transmitting and receiving timings when the radio communication apparatuses shown in FIG. 33 communicate with each other;

DETAILED DESCRIPTION OF THE INVENTION

Figure 1:
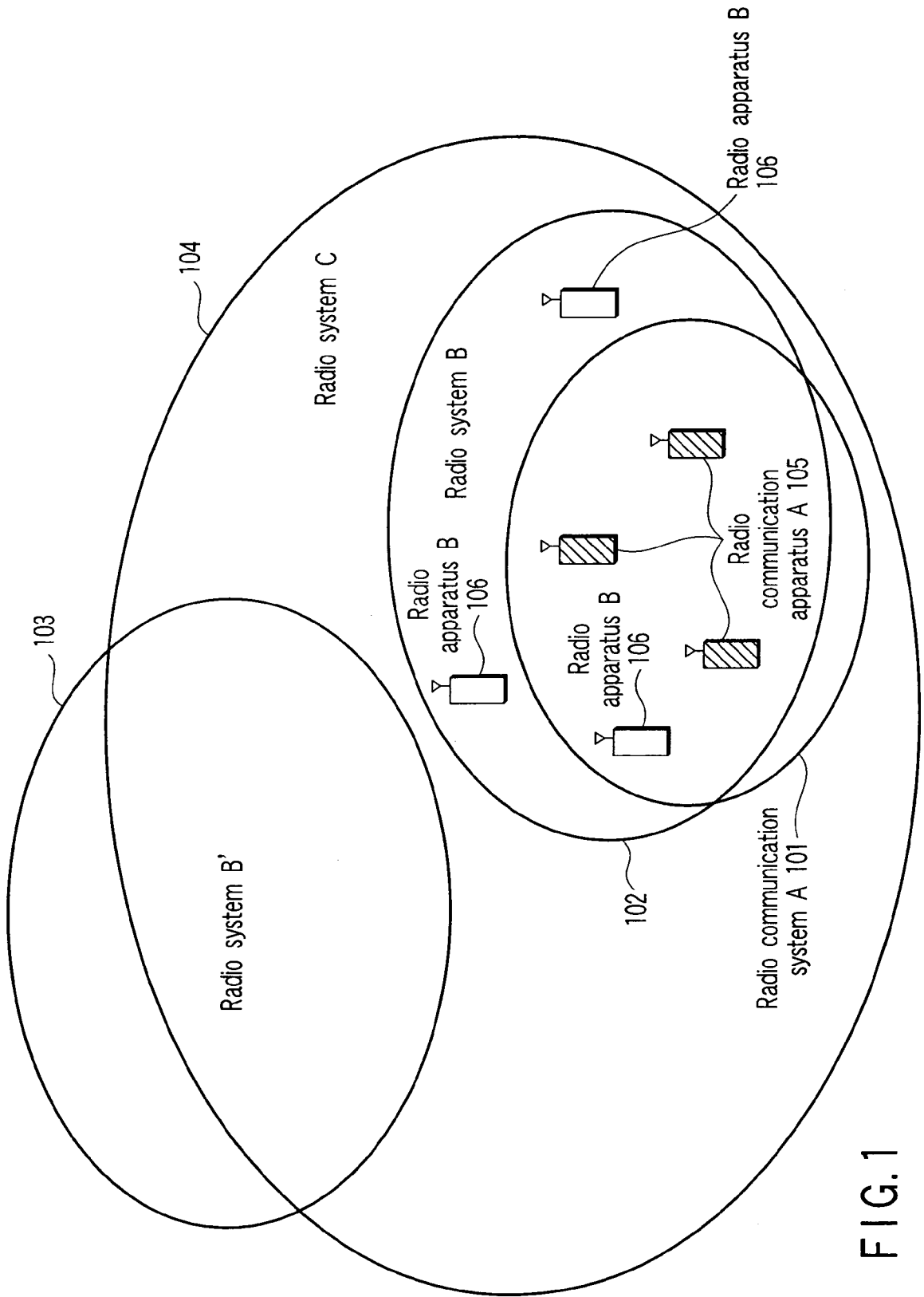
FIG. 1 is a view showing the locations of a radio communication system A including radio communication apparatuses according to embodiments, and other radio systems B and C.

A radio communication apparatus and method according to embodiments of the invention will be described in detail hereinafter with reference to the accompanying drawings. Note that components denoted by the same reference numerals throughout the following embodiment make the same operations, and a repetitive description thereof will be avoided.

This embodiment has been made in consideration of the aforementioned problems, and has as its object to provide a radio communication apparatus and method, which allow a receiving terminal to make a radio communication by detecting and demodulating a frequency channel used in transmission of a frame, and that frame, even when the receiving terminal does not know in advance a frequency channel selected by a transmitting terminal to transmit a frame and that frame.

A state wherein radio communication apparatuses of other radio communication systems exist around a radio communication apparatus of this embodiment will be described below with reference to FIG. 1.

FIG. 1 shows a radio communication system A 101 in which each radio communication apparatus A 105 makes a radio communication, and radio communication systems B 102 and C 104, which are different from the radio communication system A. A radio system B 102 different from the radio communication system A 101 may exist at a location where it geographically overlaps the radio communication system, or may exist at a geographically separated location, as indicated by a radio system B' 103. As the radio systems B and C, cellular systems such as a W-CDMA (Wideband-Code Division Multiple Access) system, PDC (Personal Digital Cellular) system, GSM (Global Standard for Mobile Communication) system, and the like, a MAN (Metropolitan Area Network) such as IEEE802.16e or the like, a LAN (Local Area Network) such as IEEE802.11 or the like, marine radio and radar systems, a fixed microwave system, and the like may be used.

The radio communication system A comprises a system which is not specified as a standard currently but will be established as a standard in future. Each radio communication apparatus A 105 which belongs to the radio communication system A makes radio communications by sharing the frequency band with the radio system B 102. In this case, the radio communication system A 101 is granted permission of use of frequencies at a lower priority level than the radio system B 102. Therefore, the radio communication apparatus A 105 which belongs to the radio communication system A 101 must not disturb radio communications by radio apparatuses 106 which belong to the radio system B 102.

The frequency band distribution of the frequency channels assigned to the radio system B 102 and those assigned to the radio system C 104 will be described below with reference to FIG. 2.

Figure 2:
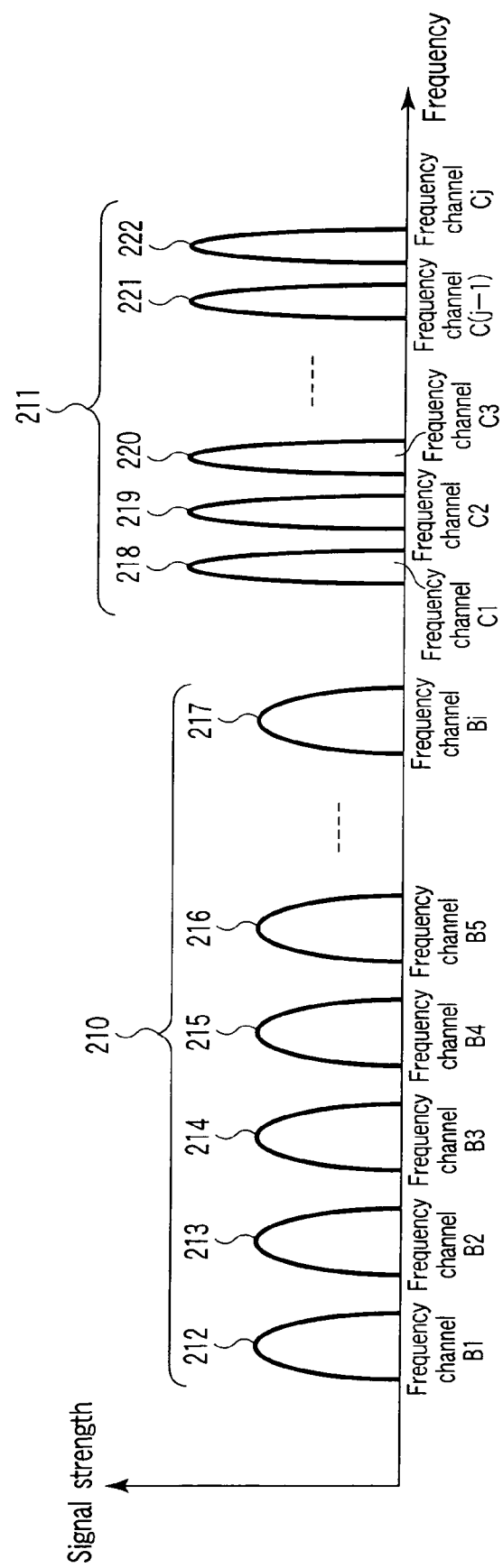
FIG. 2 shows a plurality of frequency channels in a frequency band assigned to the radio systems B and C shown in FIG. 1.

FIG. 2 shows a plurality of frequency channels B1 212, B2 213, B3 214, B4 215, B5 216, . . . , Bi 217, of a frequency band 210 assigned to the radio system B 102, and a plurality of frequency channels C1 218, C2 219, C3 220, . . . , C(j−1) 221, and Cj 222 in a frequency band 221 assigned to the radio system C 104. Each radio communication apparatus A 105, which belongs to the radio communication system A 101 shown in FIG. 1, concurrently shares and uses, for example, the frequency channels B2 213, B3 214, B4 215, and B5 216 assigned to the radio system B 102 shown in FIG. 2. The radio communication system A 101 is granted permission of use of frequencies at a lower priority level than the radio system B 102. Hence, when a given radio apparatus 106 which belongs to the radio system B 102 uses, e.g., the frequency channel B3 214, no radio communication apparatus A 105, which belongs to the radio communication system A 101, transmits a signal using a frequency corresponding to the frequency channel B3 214, so that they do not disturb a radio communication made by the radio apparatus 106 using the frequency channel B3 214. In this manner, each radio communication apparatus A 105, which belongs to the radio communication system A 101, concurrently shares and uses the frequency channels of the radio system which share the frequencies. When a radio system with a higher priority level begins to use a given frequency channel, no radio communication apparatus A 105 transmits a signal using this frequency channel, and transmits a signal using only the frequency channel which is determined not to be used, thus continuing a communication of the radio communication system A 101.

In the above description, the radio systems B 102 and C 104 have been exemplified as those with which the radio communication system A 101 shares the frequency band with reference to FIGS. 1 and 2. The number of radio systems with which the radio communication system A 101 shares the frequency band is not particularly limited. For example, the radio communication system A 101 may share the frequency band with radio systems D, E, and the like, which are different from the radio systems B 102 and C 104. In this case as well, the radio communication system A 101 is granted permission of use of the frequency band at a lower priority level than the radio systems D, E, and the like. The radio communication apparatus A 105 shown in FIG. 1 may be separated into a radio base station A and radio terminal A.

A case will be exemplified hereinafter wherein the radio communication system A 101 shown in FIG. 1 makes a radio communication by sharing the frequencies with the radio system B 102 shown in FIG. 1.

First Embodiment

In the first embodiment, one frequency channel is selected, and a control signal is transmitted using the selected frequency channel.

Figure 3:
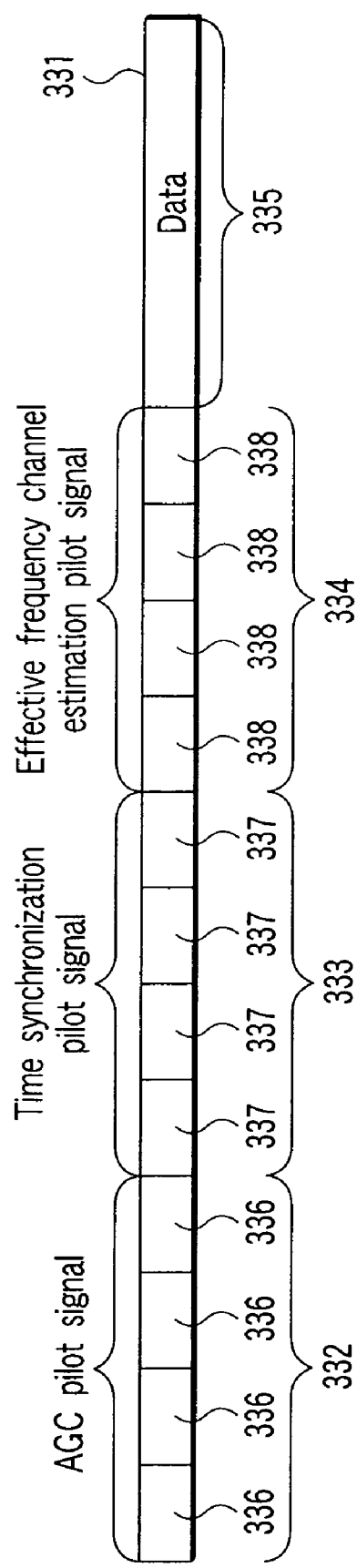
FIG. 3 shows an example of a frame format used in the radio communication system A including radio communication apparatuses of the first embodiment.

An example of a frame format of this embodiment will be described below with reference to FIG. 3. FIG. 3 shows an example of a frame format to be transmitted by the radio communication system A of this embodiment.

A frame 331 shown in FIG. 3 includes an AGC (Automatic Gain Control) pilot signal field 332, time synchronization pilot signal field 333, effective frequency channel estimation pilot signal field 334, and data field 335. The AGC pilot signal field 332 includes a plurality of AGC pilot signals 336. The pilot signal field 333 for time synchronization includes a plurality of pilot signals 337 for time synchronization. The effective frequency channel estimation pilot signal field 334 includes a plurality of pilot signals 338 for effective frequency channel estimation. The pilot signal 338 for effective frequency channel estimation is a signal determined in advance by the system so as to identify that a frame including this signal is a frame transmitted by a frequency channel selected by the transmitting radio communication apparatus.

The radio communication apparatus of this embodiment determines, based on the pilot signal 338 for effective frequency channel estimation, whether or not a signal is transmitted by the transmitting radio communication apparatus of the radio communication system A.

The radio communication apparatus A 105 of this embodiment will be described below with reference to FIG. 4. FIG. 4 is a schematic block diagram showing an example of the arrangement of the radio communication apparatus A 105 according to one embodiment of the invention.

The radio communication apparatus A 105 of this embodiment includes a transmission unit 441, control unit 442, and receiving unit 443. The transmission unit 441 includes an effective frequency channel detection pilot signal allocation unit 444 and frame transmission unit 445. The control unit 442 includes a carrier sense unit 446 and frequency channel selection unit 447. The receiving unit 443 includes a frame detection unit 448, AGC unit 449, timing synchronization unit 450, effective frequency channel decision unit 451, and frame receiving unit 452.

The carrier sense unit 446 performs carrier sense for a predetermined bandwidth so as to determine whether or not an available frequency channel is detected. This bandwidth is used by a corresponding system and is determined in advance in that system. More specifically, the transmitting and receiving radio communication apparatuses have information of the common bandwidth.

The frequency channel selection unit 447 selects an available frequency channel upon receiving of the carrier sense result of the carrier sense unit 446.

The effective frequency channel detection pilot signal allocation unit 444 allocates pilot signals for effective frequency channel estimation in the effective frequency channel estimation pilot signal field 334 included in a transmission frame.

The frame transmission unit 445 executes modulation processing of a frame shown in FIG. 3, and transmits a transmission frame from an antenna.

The frame detection unit 448 executes frame detection processing in respective frequency channels in the predetermined bandwidth, and checks if a frame is detected.

When a frame is detected, the AGC unit 449 executes AGC of the receiving signal. That is, the AGC unit 449 adjusts the receiving signal to an appropriate amplitude value.

The timing synchronization unit 450 synchronizes the signal that has undergone the AGC to adjust that signal to the timing of the receiving frame.

The effective frequency channel decision unit 451 calculates a correlation with a pilot signal included in the receiving frame received by the receiving unit with a pilot signal held in advance, thus deciding the effective frequency channel.

The frame receiving unit 452 executes demodulation processing of the frame to acquire data included in that frame.

An example of processing executed when the radio communication apparatus A shown in FIG. 4 transmits a signal will be described below with reference to FIG. 5.

The carrier sense unit 446 executes carrier sense for a predetermined bandwidth, and outputs the carrier sense result to the frequency channel selection unit 447 (step S501). The frequency channel selection unit 447 checks based on the carrier sense result acquired from the carrier sense unit 446 if an available frequency channel is detected (step S502). If an available frequency channel is detected, the frequency channel selection unit 447 selects the frequency channel used to transmit a frame, and outputs the selected channel to the transmission unit 441 (step S503). If no available frequency channel is detected, the carrier sense unit 446 repeats the processing in step S501. The effective frequency channel detection pilot signal allocation unit 444 in the transmission unit 441 allocates a pilot signal for effective frequency channel estimation in the effective frequency channel estimation pilot signal field 334 of the frame shown in FIG. 3 (step S504). Note that the receiving radio communication apparatus has this pilot signal for effective frequency channel estimation in advance. The frame transmission unit 445 of the transmission unit 441 executes modulation processing of the frame shown in FIG. 3, and transmits the frame (step S505).

Figure 6:
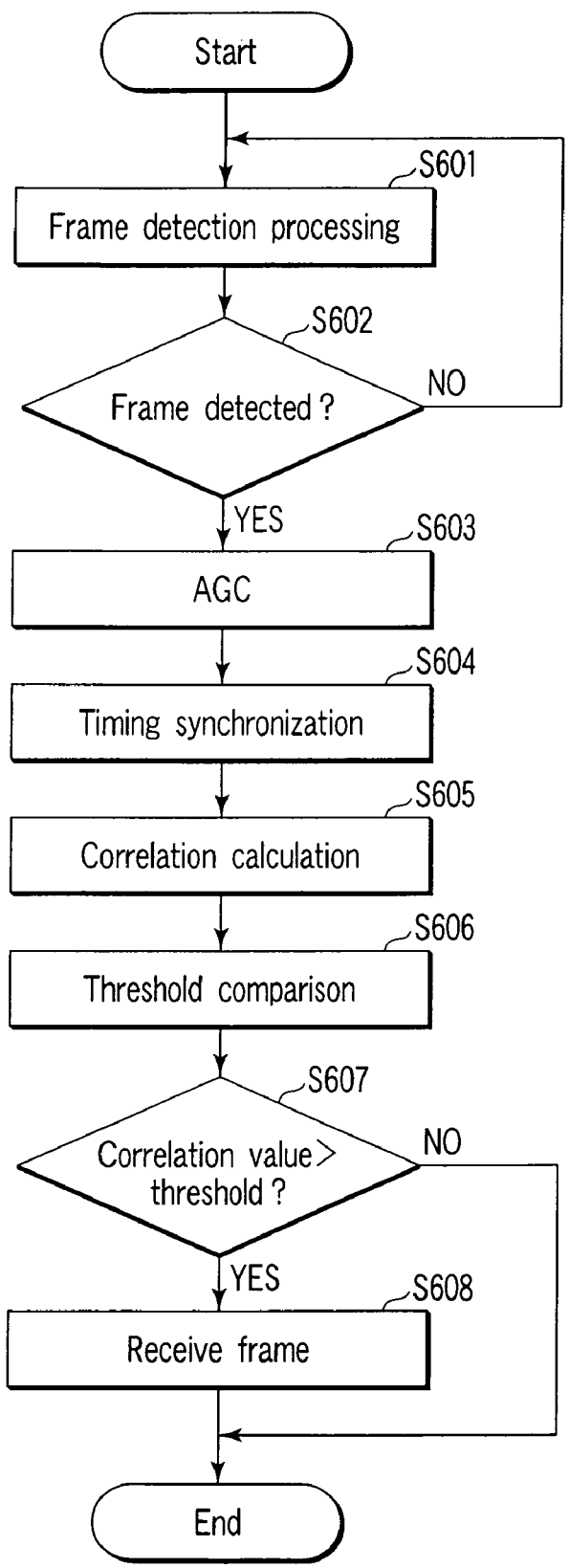
FIG. 6 is a flowchart showing an example of processing executed when the radio communication apparatus shown in FIG. 4 receives a signal.

An example of the processing executed when the radio communication apparatus A shown in FIG. 4 receives a signal will be described below with reference to FIG. 6.

The frame detection unit 448 executes frame detection processing in respective frequency channels within a predetermined bandwidth (step S601), and checks if a frame is detected (step S602). If a frame is detected, the AGC unit 449 executes AGC of an input signal (step S603), and the timing synchronization unit 450 executes timing synchronization of the signal which has been adjusted to an appropriate amplitude value by the AGC (step S604). On the other hand, if no frame is detected in step S602, the frame detection processing (step S601) and subsequent processing are repeated. The timing synchronization processing is implemented by marking correlation calculations between known signal sequences and the receiving signal, and detecting a peak of correlation values, thereby adjusting the timing to the receiving frame. The effective frequency channel decision unit 451 makes a correlation calculation of the signal, the timing synchronization of which has been established, with a predetermined pilot signal for effective frequency channel estimation (step S605), and compares a correlation value with a threshold value (step S606). If the correlation value is larger than the threshold value, the unit 451 determines that the frame transmitted using this frequency channel is that transmitted using an effective frequency channel (step S607), thus executing the receiving processing of the frame (step S608). If the correlation value is smaller than the threshold value, the unit 451 determines that this frequency channel is not an effective frequency channel (step S607), thus ending the processing without executing the frame receiving processing.

An example of the correlation value output between the pilot signal for effective frequency channel estimation and the receiving signal when the radio communication apparatus A receives a frame transmitted by the radio communication system A will be described below with reference to FIG. 7.

A signal (frame) 331 shown in FIG. 7 indicates a signal (frame) transmitted by the radio communication system A, and includes the AGC pilot signal field 332, time synchronization pilot signal field 333, effective frequency channel estimation pilot signal field 334, and data field 335, as shown in FIG. 3. In the example shown in FIG. 7, assume that a signal sequence A is used as the pilot signals for effective frequency channel estimation.

A lower graph of FIG. 7 shows an example of a correlation value output 701 between the pilot signal for effective frequency channel estimation and the receiving signal. A value 700 indicates a threshold value used to determine whether or not a frame is transmitted using the effective frequency channel. The radio communication apparatus A 105 can detect the temporal position of the receiving signal using the time synchronization pilot signal field 333. In the example shown in FIG. 7, since the correlation value 701 exceeds the threshold value 700 at time t1 immediately after receiving of the signal sequence A, the radio communication apparatus A 105 determines that this signal is a signal of the radio communication system A, and demodulates data.

An example of the correlation value output between the pilot signal for effective frequency channel estimation and the receiving signal when the radio communication apparatus A receives a frame transmitted by the radio communication system B will be described below with reference to FIG. 8.

A signal 801 in FIG. 8 indicates a signal transmitted by the radio communication system B. The lower graph of FIG. 8 shows an example of a correlation value output 802 between the pilot signal for effective frequency channel estimation and the receiving signal, and the value 700 is the threshold value used to determine whether or not a frame is transmitted using an effective frequency channel. The radio communication apparatus A 105 can detect the temporal position of the receiving signal using the time synchronization pilot signal field 333. In the example shown in FIG. 8, the correlation value 802 does not exceed the threshold value 700 from the beginning of receiving of the signal at time t0 even after an elapse of the receiving end time (time 1) of the effective frequency channel estimation pilot signal field. Therefore, the radio communication apparatus A 105 determines that this signal is not a signal of the radio communication system A, and skips demodulation processing of data.

Figure 9:
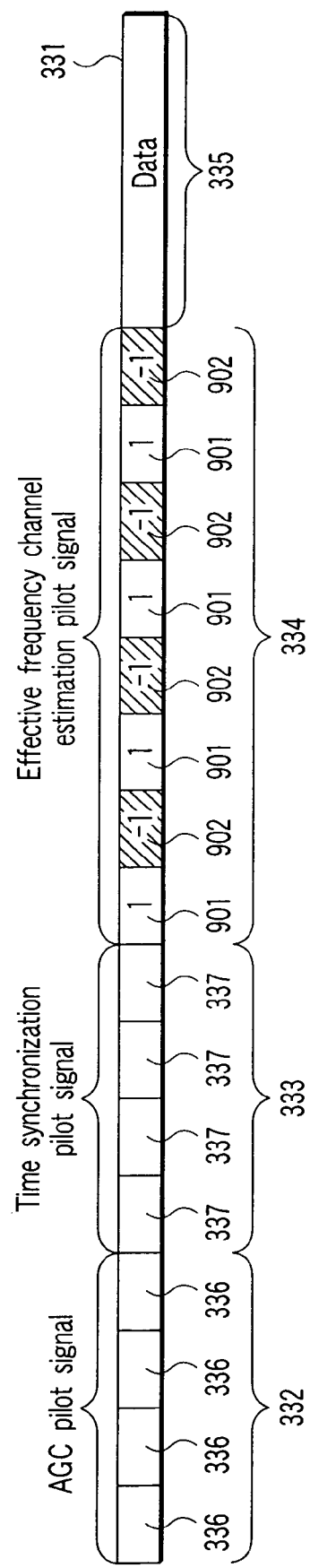
FIG. 9 shows an example of a frame format used in the radio communication system A including the radio communication apparatuses of the first embodiment.

An example of the contents of the effective frequency channel estimation pilot signal field 334 in the frame format shown in FIG. 3 will be described below with reference to FIG. 9. FIG. 9 shows an example of the frame format to be transmitted by the radio communication system A according to the embodiment.

In the effective frequency channel estimation pilot signal field 334 shown in FIG. 9, a symbol 901 with a value "1" and a symbol 902 with a value "−1" alternatively repeat. In this way, using values having different polarities for respective symbols as the effective frequency channel estimation pilot signal field, high precision of effective frequency channel estimation can be assured.

According to the first embodiment described above, a part of a frame to be transmitted by the radio communication system A includes a field used to allocate a predetermined pilot signal sequence for identifying that this frame is a frame transmitted using a frequency channel selected by the transmitting radio communication apparatus of the radio communication system A based on the carrier sense result. Hence, even when the frequency channel used to transmit the frame is unknown, the receiving radio communication apparatus which belongs to the radio communication system A can detect the frequency channel used to transmit the frame by detecting this pilot signal, and this frame, thus making a radio communication.

The transmitting side of the radio communication apparatus A comprises the effective frequency channel detection pilot signal allocation unit 444 which allocates the pilot signal for effective frequency channel estimation, and the receiving side of the radio communication apparatus A comprises the effective frequency channel decision unit 451. Hence, even when the frequency channel used to transmit a frame is unknown, the receiving unit of the radio communication apparatus A can detect the frequency channel used to transmit the frame by detecting this pilot signal, and this frame, thus making a radio communication.

Second Embodiment

The second embodiment and subsequent embodiments select a plurality of frequency channels, and transmit a control signal using the selected frequency channels.

Figure 10:
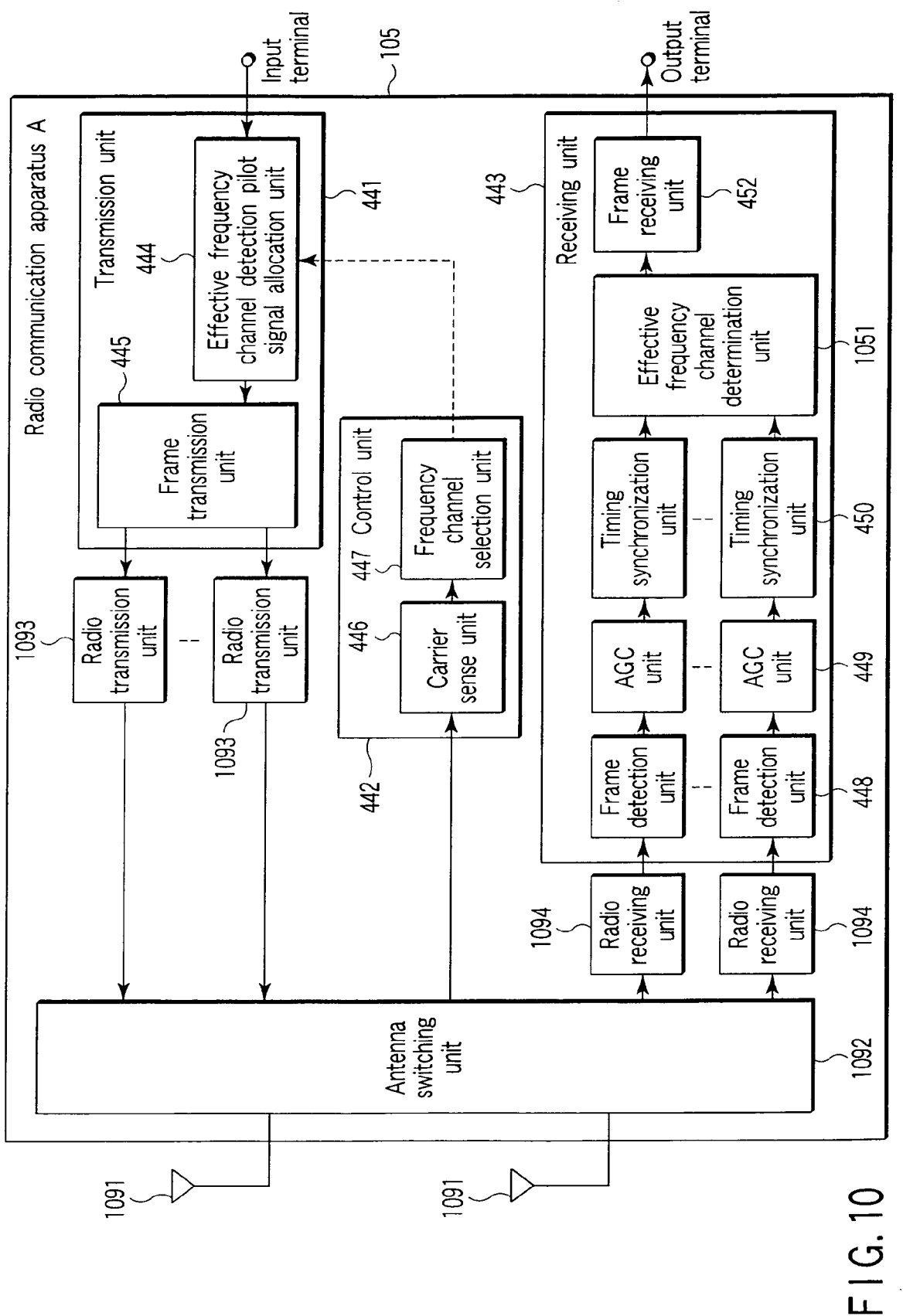
FIG. 10 is a block diagram of a radio communication apparatus of the second embodiment.

A radio communication apparatus of this embodiment will be described below with reference to FIG. 10. The radio communication apparatus of this embodiment is different from that of the first embodiment in that a plurality of radio transmission units 1093 and a plurality of radio receiving units 1094 are newly added, and the receiving unit 443 includes a plurality of frame detection units 448, a plurality of AGC units 449, and a plurality of timing synchronization units 450. As a result of this modification, since an effective frequency channel decision unit 1051 receives a plurality of frames, the control processes are different. Furthermore, a plurality of antennas 1091 are provided, and an antenna switching unit 1092 is newly added.

The antenna switching unit 1092 switches connections between the antennas 1091 and the radio transmission units or radio receiving units upon transmitting or receiving a frame. That is, upon transmitting a frame, the unit 1092 connects the antennas 1091 and the radio transmission units 1093. Upon receiving a frame, the unit 1092 connects the antennas 1091 and the radio receiving units 1094.

Each radio transmission unit 1093 converts a signal generated by the frame transmission unit 445 into a radio frequency (RF) signal, and outputs the signal to the antennas 1091 via the antenna switching unit 1092.

Each radio receiving unit 1094 frequency-converts a receiving signal from the antennas 1091 into an intermediate frequency or baseband signal, and outputs the signal to the frame detection unit 448.

Figure 20:
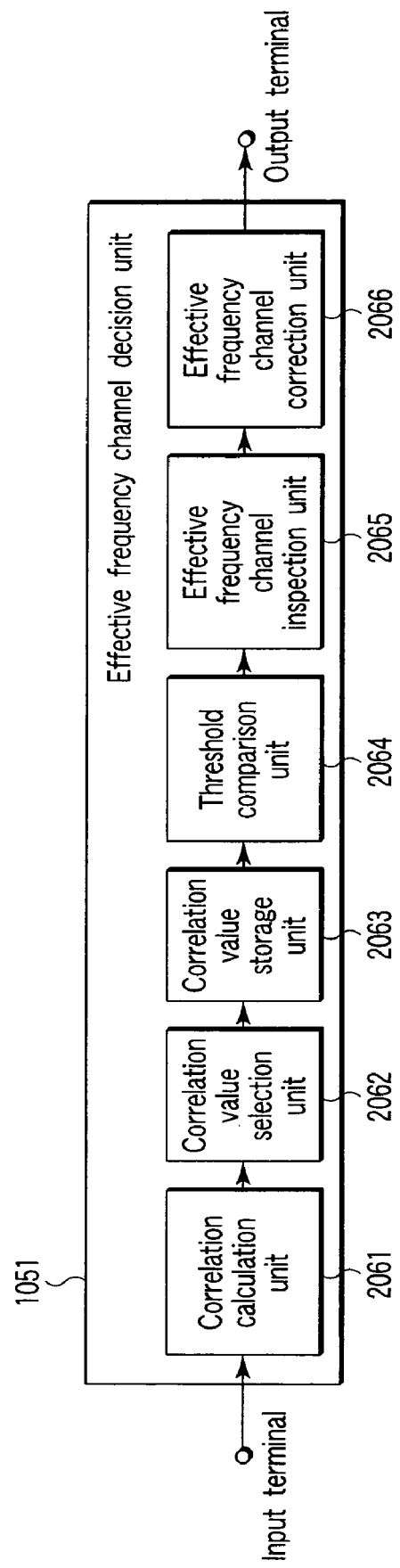
FIG. 20 is a block diagram of an effective frequency channel decision unit included in the radio communication apparatus of the third embodiment.

The effective frequency channel decision unit 1051 will be described later with reference to FIG. 20.

Figure 11:
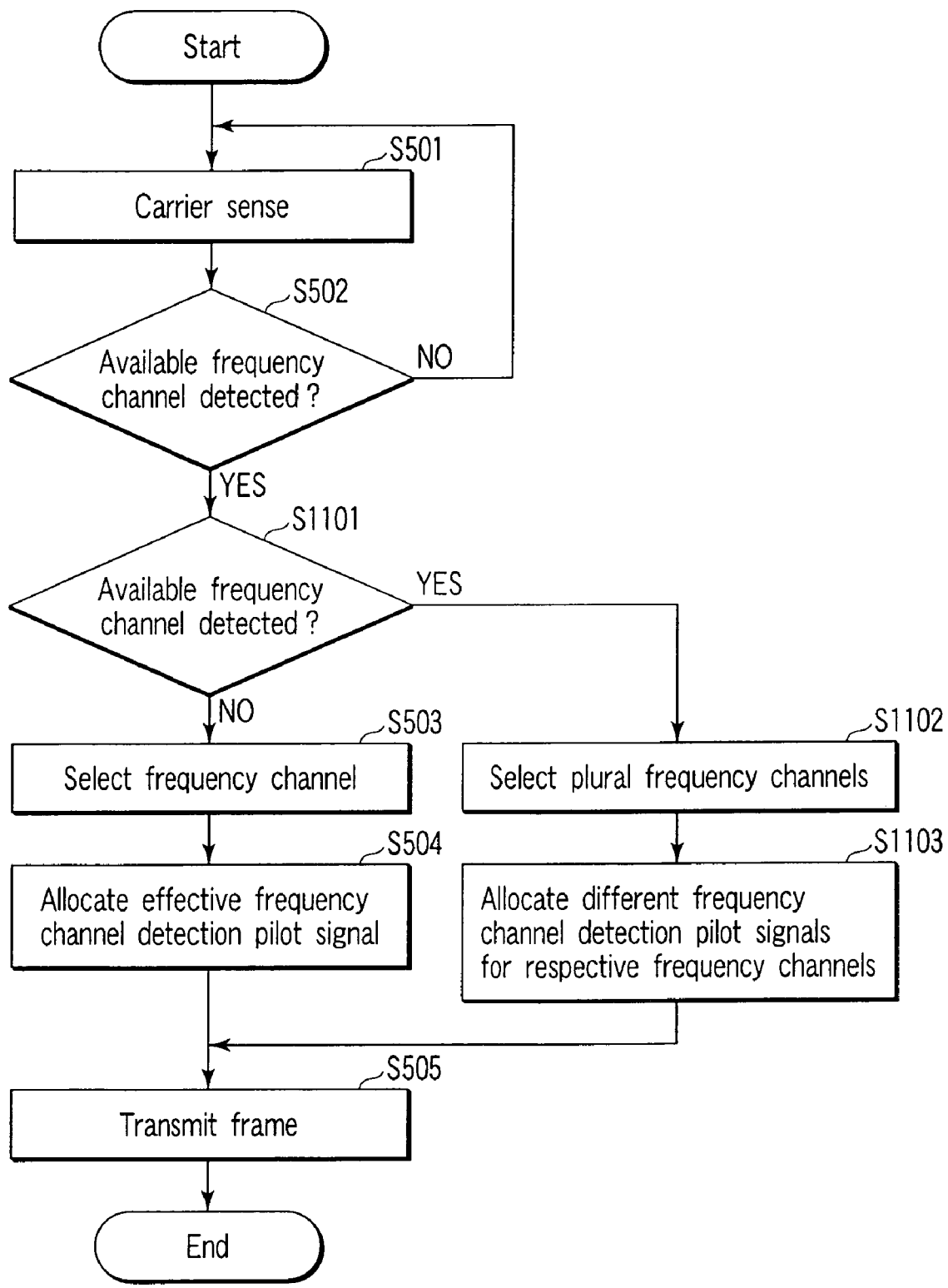
FIG. 11 is a flowchart showing an example of processing executed when the radio communication apparatus shown in FIG. 10 transmits a signal.

An example of the processing executed when the radio communication apparatus A shown in FIG. 10 transmits a signal will be described below with reference to FIG. 11.

If it is determined in step S502 that an available frequency channel is detected, the carrier sense unit 446 checks if a plurality of available frequency channels are detected (step S1101). If a plurality of available frequency channels are not detected, the processes in step S503 and subsequent steps shown in FIG. 5 is executed. If a plurality of available frequency channels are detected (step S1101), the frequency channel selection unit 447 selects a plurality of frequency channels used to transmit frames, and outputs the selected frequency channels to the transmission unit 441 (step S1102). The effective frequency channel detection pilot signal allocation unit 444 in the transmission unit 441 allocates different pilot signals for effective frequency channel estimation in accordance with predetermined patterns for each of the plurality of selected frequency channels in the effective frequency channel estimation pilot signal field 334 shown in FIG. 3 (step S1103). The frame transmission unit 445 of the transmission unit 441 executes the modulation processing of a frame shown in FIG. 3, divides the modulated frame into the plurality of frequency channels, and outputs the divided frames to the radio transmission units 1093, thus transmitting the frames (step S505).

Figure 12:
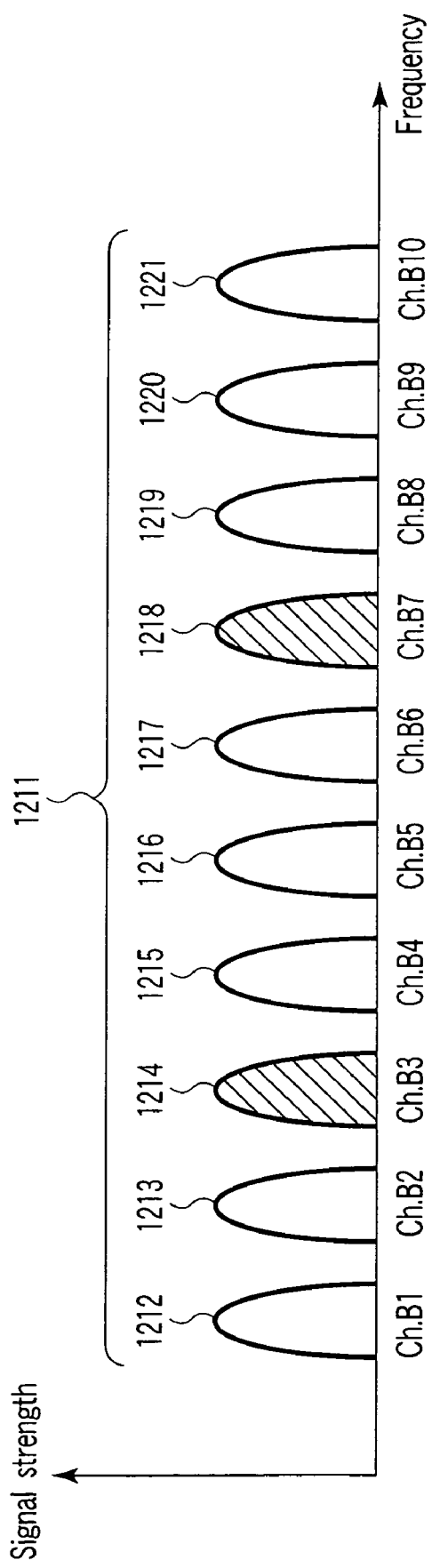
FIG. 12 shows frequency channels of the radio system B, the frequencies of which are shared by the radio communication system A.

An example of the carrier sense result of the carrier sense unit 446 shown in FIG. 10 will be described below with reference to FIG. 12. FIG. 12 shows the frequency channels of the radio system B 102, the frequencies of which are shared by the radio communication system A 101.

A frequency band 1211 shown in FIG. 12 indicates the frequency bandwidth assigned to the radio system B 102, and frequency channels B1 (Ch.B1 1212) to B10 (Ch.B10 1221) respectively indicate those of the radio system B 102. In FIG. 12, hatched frequency channels B3 1214 and B7 1218 are those which are determined as a result of carrier sense of the carrier sense unit 446 of the radio communication apparatus A 105 that they are in use by a radio apparatus belonging to the radio system B 102. Assume that the radio communication apparatus A 105 transmits frames using eight frequency channels, i.e., the frequency channels B1 (Ch.B1 1212), B2 (Ch.B2 1213), B4 (Ch.B4 1215), B5 (Ch.B5 1216), B6 (Ch.B6 1217), B8 (Ch.B8 1219), B9 (Ch.B9 1220), and B10 (Ch.B10 1221), which are not used by the radio apparatus of the radio system B 102.

An example of the frame format to be transmitted by the radio communication system A when the radio communication apparatus A 105 transmits frames using a plurality of frequency channels will be described below with reference to FIG. 13.

Figure 13:
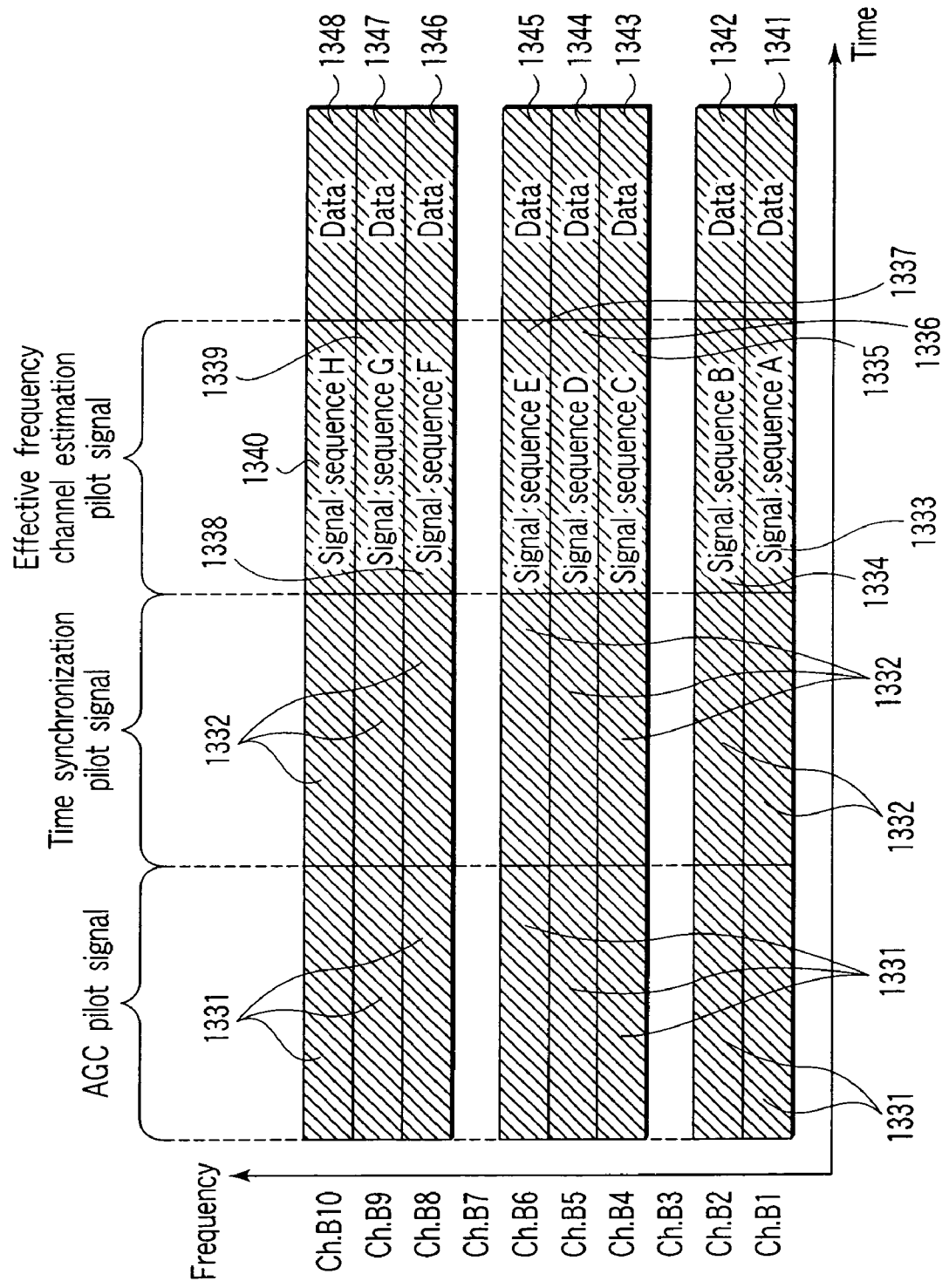
FIG. 13 shows a first example of a frame format used in the radio communication system A including the radio communication apparatus shown in FIG. 10.

FIG. 13 shows an example in which the frame format shown in FIG. 3 is respectively used in the eight frequency channels. As shown in FIG. 13, to the effective frequency channel estimation pilot signal field, a signal sequence A 1333 is assigned, according to a predetermined pattern, in the frequency channel B1; a signal sequence B 1334 in the frequency channel B2; a signal sequence C 1335 in the frequency channel B4; a signal sequence D 1336 in the frequency channel B5; a signal sequence E 1337 in the frequency channel B6; a signal sequence F 1338 in the frequency channel B8; a signal sequence G 1339 in the frequency channel B9; and a signal sequence H 1340 in the frequency channel B10.

The frequency channels B3 and B7 are used in a radio system which has a higher priority level than the radio communication system A. The radio communication apparatus A has already detected the use of these frequency channels by the carrier sense of its carrier sense unit 446.

An example of a frame format to be transmitted by the radio communication system A, which is different from that in FIG. 13, when the radio communication apparatus A 105 transmits frames using a plurality of frequency channels will be described below with reference to FIG. 14.

FIG. 14 shows the frame format used by the radio communication apparatus A 105 when frequency channels which neighbor the frequency channels that are being used by the radio apparatus which belongs to the radio system B 102 are used as guard bands in addition to the frequency channels in use. In the example shown in FIG. 14, the radio communication apparatus A 105 transmits frames using four frequency channels, i.e., the frequency channels B1 (Ch.B1 1212), B5 (Ch.B5 1216), B9 (Ch.B9 1220), and B10 (Ch.B10 1221).

Therefore, to the effective frequency channel estimation pilot signal fields of frames to be transmitted by the radio communication apparatus 105, the signal sequence A 1333 is assigned, in accordance with a predetermined pattern, in the frequency channel B1; the signal sequence B 1336 in the frequency channel B5; the signal sequence C 1339 in the frequency channel B9; and the signal sequence D 1340 in the frequency channel B10.

As described above, according to the second embodiment, in addition to the effects of the first embodiment, since different signal sequences are assigned for respective frequency channels in accordance with a predetermined pattern determined for each system to the effective frequency channel estimation pilot signal field, the effective frequency channels detected by the receiving radio communication apparatus are inspected by referring to the regularity of frequency directions. When any error is found, the precision of effective frequency channel estimation can be improved by correcting that error.

Third Embodiment

In this embodiment, the number of signal sequences used in the second embodiment is selected from a plurality of signal sequences. That is, a signal sequence used as a pilot signal for effective frequency channel estimation is selected from a limited number of signal sequences.

Figure 15:
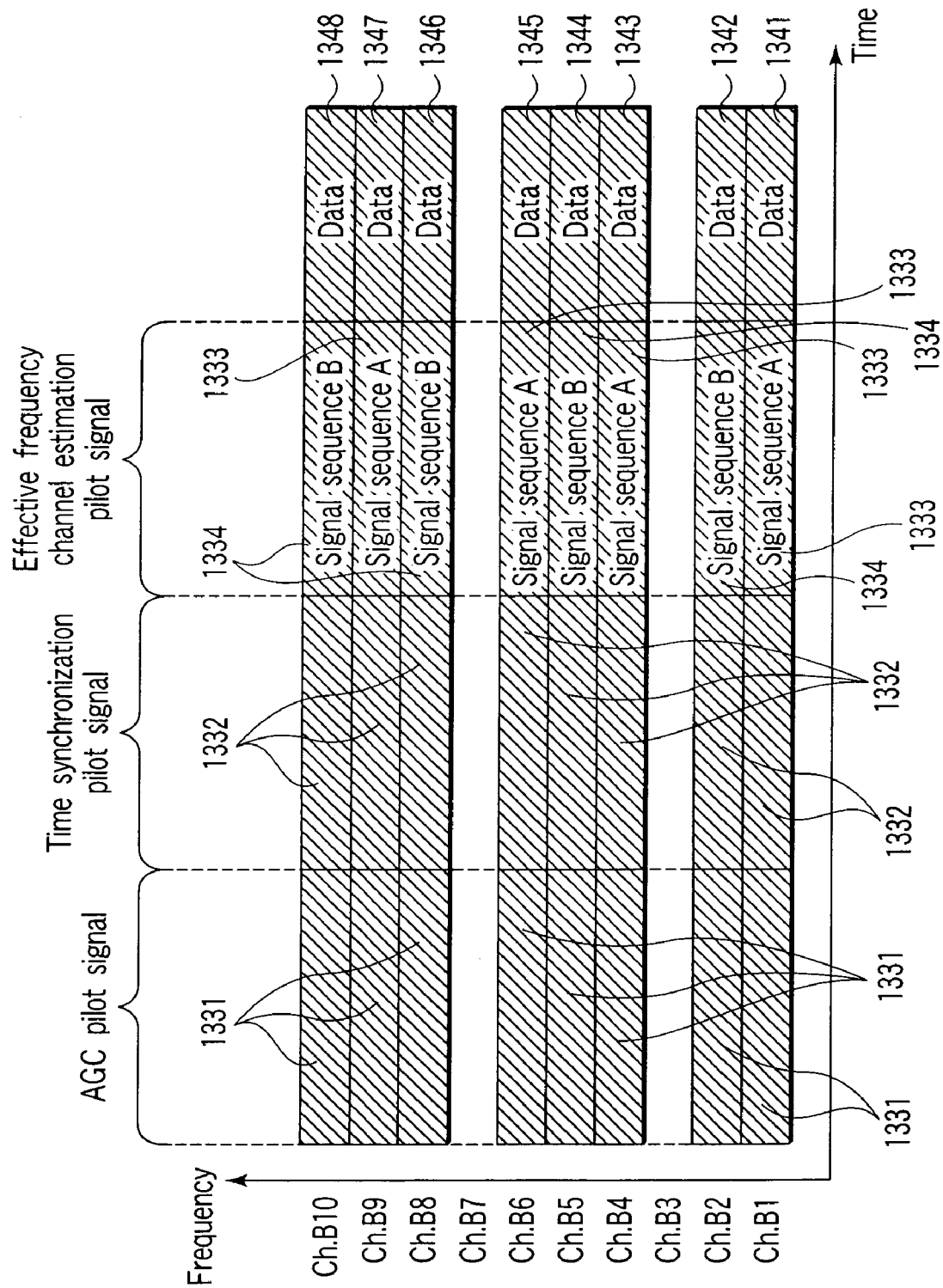
FIG. 15 shows a third example of a frame format used in the radio communication system A including the radio communication apparatus shown in FIG. 10.

An example of the frame format to be transmitted by the radio communication system A when the radio communication apparatus A 105 of this embodiment transmits frames using a plurality of frequency channels will be described below with reference to FIG. 15. FIG. 15 shows a modification of the contents of the effective frequency channel estimation pilot signal fields of the frame format shown in FIG. 13.

In this embodiment, signal sequences A and B are prepared as two signal sequences, and are repetitively assigned in turn from effective frequency channels with lower frequencies. Therefore, as shown in FIG. 15, the signal sequence A 1333 is assigned in the frequency channel B1; the signal sequence B 1334 in the frequency channel B2; the signal sequence A 1333 in the frequency channel B4; the signal sequence B 1334 in the frequency channel B5; the signal sequence A 1333 in the frequency channel B6; the signal sequence B 1334 in the frequency channel B8; the signal sequence A 1333 in the frequency channel B9; and the signal sequence B 1334 in the frequency channel B10.

A first example of the relationship between the frequency channel bandwidth and the bandwidth of a frequency channel of a radio communication made by the radio communication system A 101 or of one subcarrier upon making an OFDM communication will be described below with reference to FIG. 16.

Figure 16:
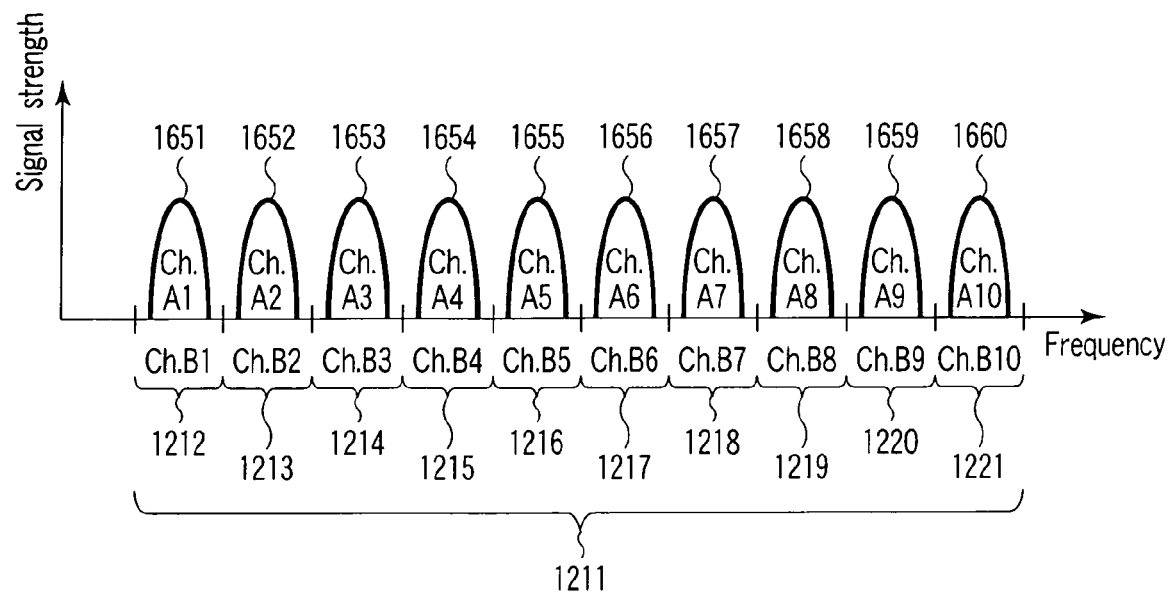
FIG. 16 is a chart showing the first relationship between the frequency channels of the radio system B and those of the radio communication system A or the frequency band of subcarriers upon making OFDM communications in the third embodiment.

Referring to FIG. 16, the frequency band 1211 indicates a frequency bandwidth assigned to the radio system B 102, and the frequency channels B1 (Ch.B1 1212) to B10 (Ch.B10 1221) indicate those of the radio system B 102, as in FIG. 12. Frequency channels A1 (Ch.A1 1651) to A10 (Ch.A10 1660) are those used in radio communications made by the radio communication system A 101. FIG. 16 shows an example in which the bandwidth of one frequency channel of the radio communication system A 101 is equal to that of one frequency channel of the radio system B 102.

As shown in FIG. 16, a radio communication in the radio communication system A may be made by selecting the bandwidth of one frequency channel used in the radio communication system A 101 that is equal to that of one frequency channel of the radio system B 102.

A second example of the relationship between the frequency channel bandwidth and the bandwidth of a frequency channel of a radio communication made by the radio communication system A 101 or of one subcarrier upon making an OFDM communication will be described below with reference to FIG. 17.

Figure 17:
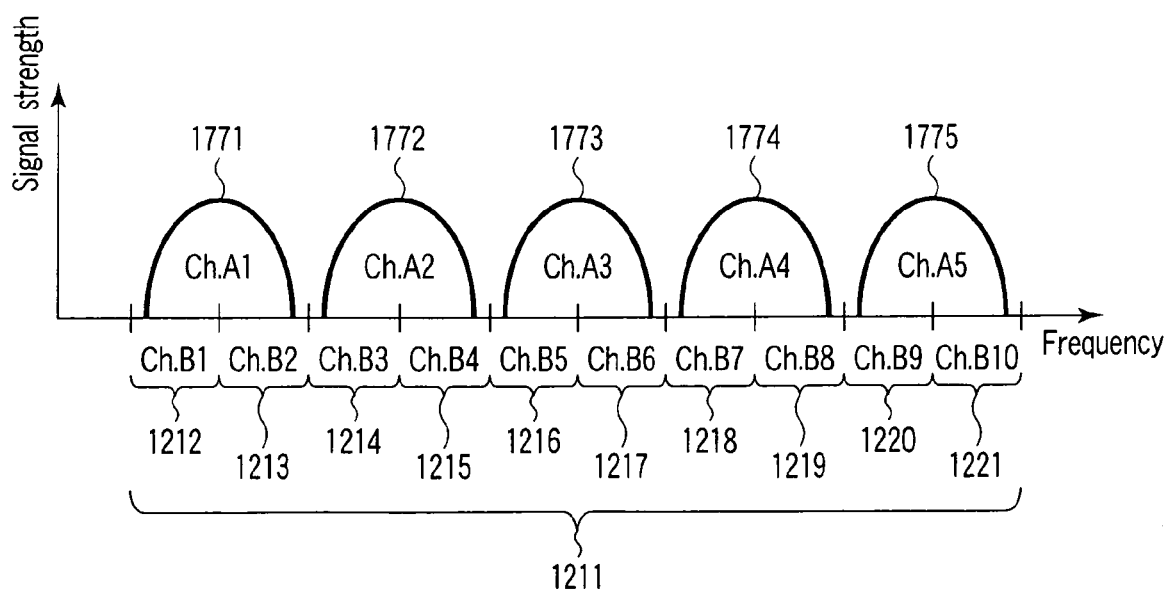
FIG. 17 is a chart showing the second relationship between the frequency channels of the radio system B and those of the radio communication system A or the frequency band of subcarriers upon making OFDM communications in the third embodiment.

Referring to FIG. 17, the frequency band 1211 indicates a frequency bandwidth assigned to the radio system B 102, and the frequency channels B1 (Ch.B1 1212) to B10 (Ch.B10 1221) indicate those of the radio system B 102, as in FIG. 16. Frequency channels A1 (Ch.A1 1771) to A5 (Ch.A5 1775) are those used in radio communications made by the radio communication system A 101. FIG. 17 shows an example in which the bandwidth of one frequency channel of the radio communication system A 101 is equal to double the bandwidth of one frequency channel of the radio system B 102.

As shown in FIG. 17, a radio communication in the radio communication system A may be made by selecting the bandwidth of one frequency channel used in the radio communication system A 101 that is equal to a multiple of the bandwidth of one frequency channel of the radio system B 102.

A third example of the relationship between the frequency channel bandwidth and the bandwidth of a frequency channel of a radio communication made by the radio communication system A 101 or of one subcarrier upon making an OFDM communication will be described below with reference to FIG. 18.

Figure 18:
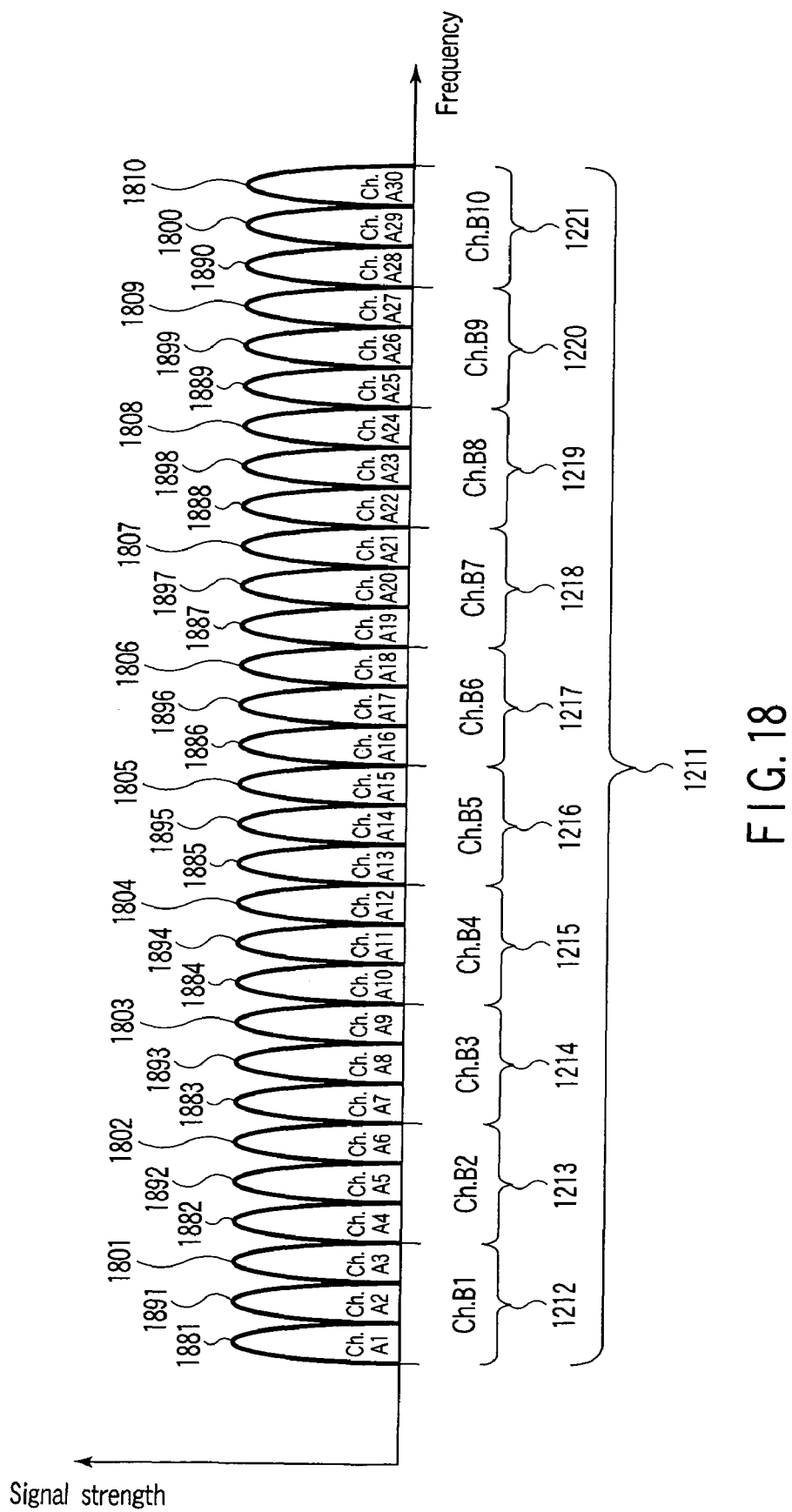
FIG. 18 is a chart showing the third relationship between the frequency channels of the radio system B and those of the radio communication system A or the frequency band of subcarriers upon making OFDM communications in the third embodiment.

Referring to FIG. 18, the frequency band 1211 indicates a frequency bandwidth assigned to the radio system B 102, and the frequency channels B1 (Ch.B1 1212) to B10 (Ch.B10 1221) indicate those of the radio system B 102, as in FIG. 16. Frequency channels A1 (Ch.A1 1881) to A30 (Ch.A30 1810) are those used in radio communications made by the radio communication system A 101. FIG. 18 shows an example in which the bandwidth of one frequency channel of the radio communication system A 101 is equal to ⅓ of the bandwidth of one frequency channel of the radio system B 102.

As shown in FIG. 18, a radio communication in the radio communication system A may be made by selecting the bandwidth of one frequency channel used in the radio communication system A 101 that is equal to a fraction of the bandwidth of one frequency channel of the radio system B 102.

Figure 19:
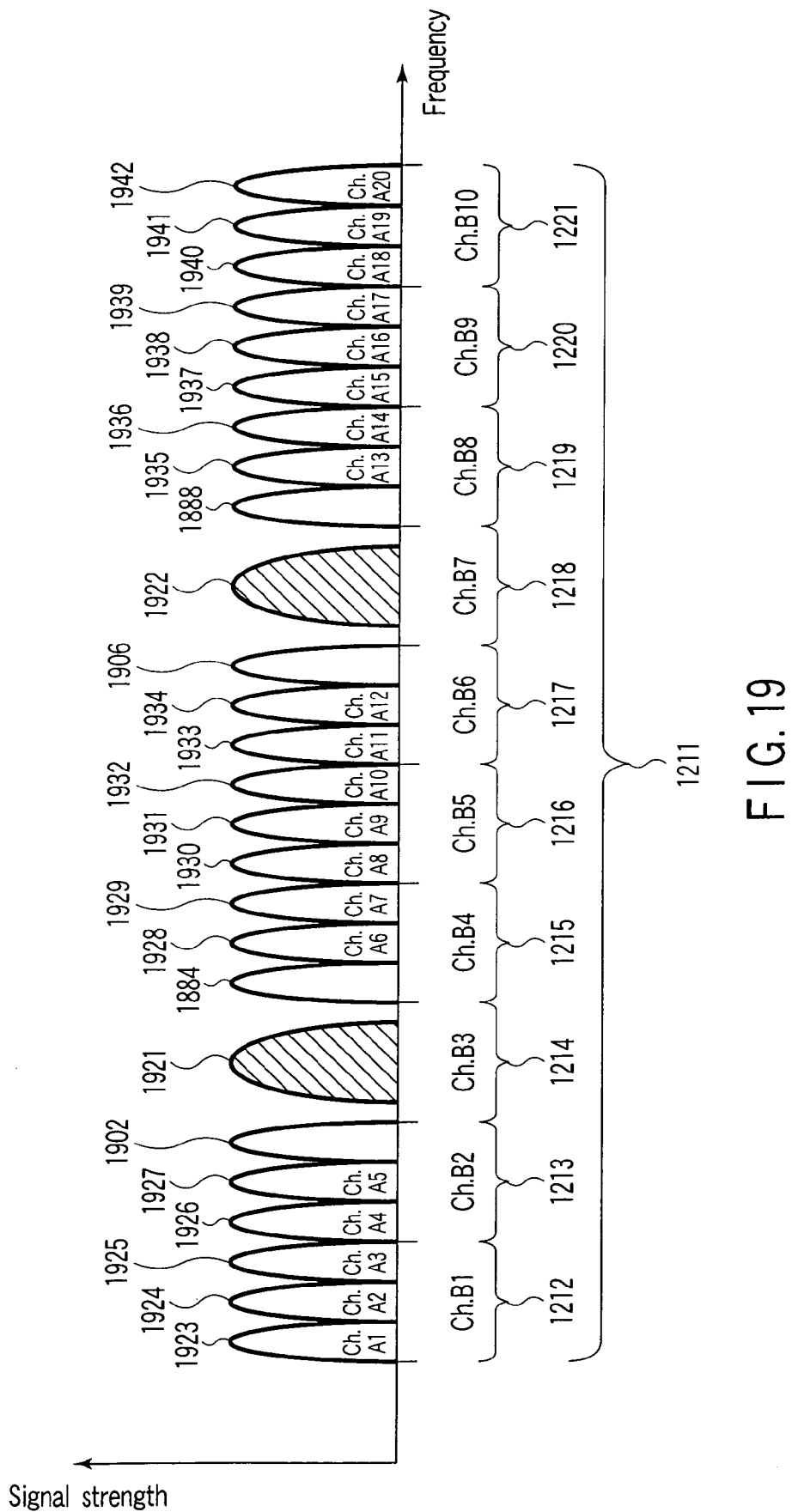
FIG. 19 is a chart showing the fourth relationship between the frequency channels of the radio system B and those of the radio communication system A or the frequency band of subcarriers upon making OFDM communications in the third embodiment.

A fourth example of the relationship between the frequency channel bandwidth and the bandwidth of a frequency channel of a radio communication made by the radio communication system A 101 or of one subcarrier upon making an OFDM communication will be described below with reference to FIG. 19. FIG. 19 shows a modification of FIG. 18.

Referring to FIG. 19, the frequency band 1211 indicates a frequency bandwidth assigned to the radio system B 102, and the frequency channels B1 (Ch.B1 1212) to B10 (Ch.B10 1221) indicate those of the radio system B 102, as in FIG. 16. Frequency channels A1 (Ch.A1 1923) to A20 (Ch.A20 1942) are those used in radio communications made by the radio communication system A 101.

Referring to FIG. 19, hatched frequency channels B3 1921 and B7 1922 indicate those which are determined as a result of carrier sense of the radio communication apparatus A 105 to be in use by a radio apparatus which belongs to the radio system B 102. FIG. 19 shows an example in which the bandwidth of one frequency channel of the radio communication system A 101 is equal to ⅓ of the bandwidth of one frequency channel of the radio system B 102. That is, FIG. 19 shows an example in which frequency bands 1902 and 1884 which neighbor the frequency channel B3 1921 determined to be used by the radio system B as a result of carrier sense of the radio communication apparatus A 105, and frequency bands 1906 and 1888 which neighbor the frequency channel B7 1922 determined to be used by the radio system B 102 are not used as the frequency channels of the radio communication system A 101.

As shown in FIG. 19, a radio communication in the radio communication system A may be made by selecting the frequency channels of the radio communication system A 101 except for the frequency bands that neighbor the frequency channels determined to be used by the radio system B 102 as a result of carrier sense.

Details of the effective frequency channel decision unit 1051 of the radio communication apparatus A of this embodiment will be described below with reference to FIG. 20. FIG. 20 is a block diagram showing an example of the internal arrangement of the effective frequency channel decision unit 1051 of the radio communication apparatus A 105 shown in FIG. 10.

The effective frequency channel decision unit 1051 includes a correlation calculation unit 2061, correlation value selection unit 2062, correlation value storage unit 2063, threshold comparison unit 2064, effective frequency channel inspection unit 2065, and effective frequency channel correction unit 2066.

The correlation calculation unit 2061 makes a correlation calculation between the receiving signal and a plurality of pilot signals determined in advance for a system, and calculates a plurality of correlation values. For example, the correlation calculation unit 2061 makes a correlation calculation between the receiving signal and pilot signal A and that between the receiving signal and pilot signal B.

The correlation value selection unit 2062 compares a plurality of correlation values calculated by the correlation calculation unit 2061, and selects a larger correlation value.

The correlation value storage unit 2063 stores the correlation value selected by the correlation value selection unit 2062. The correlation value storage unit 2063 stores the selected correlation values for all frequency channels in the predetermined frequency band for the system. The correlation value storage unit 2063 sorts the correlation values for the respective frequency channels.

The threshold comparison unit 2064 compares a predetermined threshold value with the correlation value for each frequency channel, and selects a frequency channel having a correlation value that exceeds the threshold value as an effective frequency channel candidate.

The effective frequency channel inspection unit 2065 sorts frequency channels as the effective frequency channel candidates in ascending order of frequency, and compares a pattern configured by the identifiers of pilot signals selected by the respective frequency channels with a predetermined identifier pattern. When the pattern of the identifiers of the pilot signals of the effective frequency channel candidates matches the predetermined identifier pattern, the effective frequency channel inspection unit 2065 determines the effective frequency channel candidates as effective frequency channels.

When the pattern of the identifiers of the pilot signals of the effective frequency channel candidates does not match the predetermined identifier pattern, the effective frequency channel correction unit 2066 executes correction processing of the effective frequency channel candidates. Details of the operation of the effective frequency channel correction unit 2066 will be described later with reference to FIG. 22.

Figure 21:
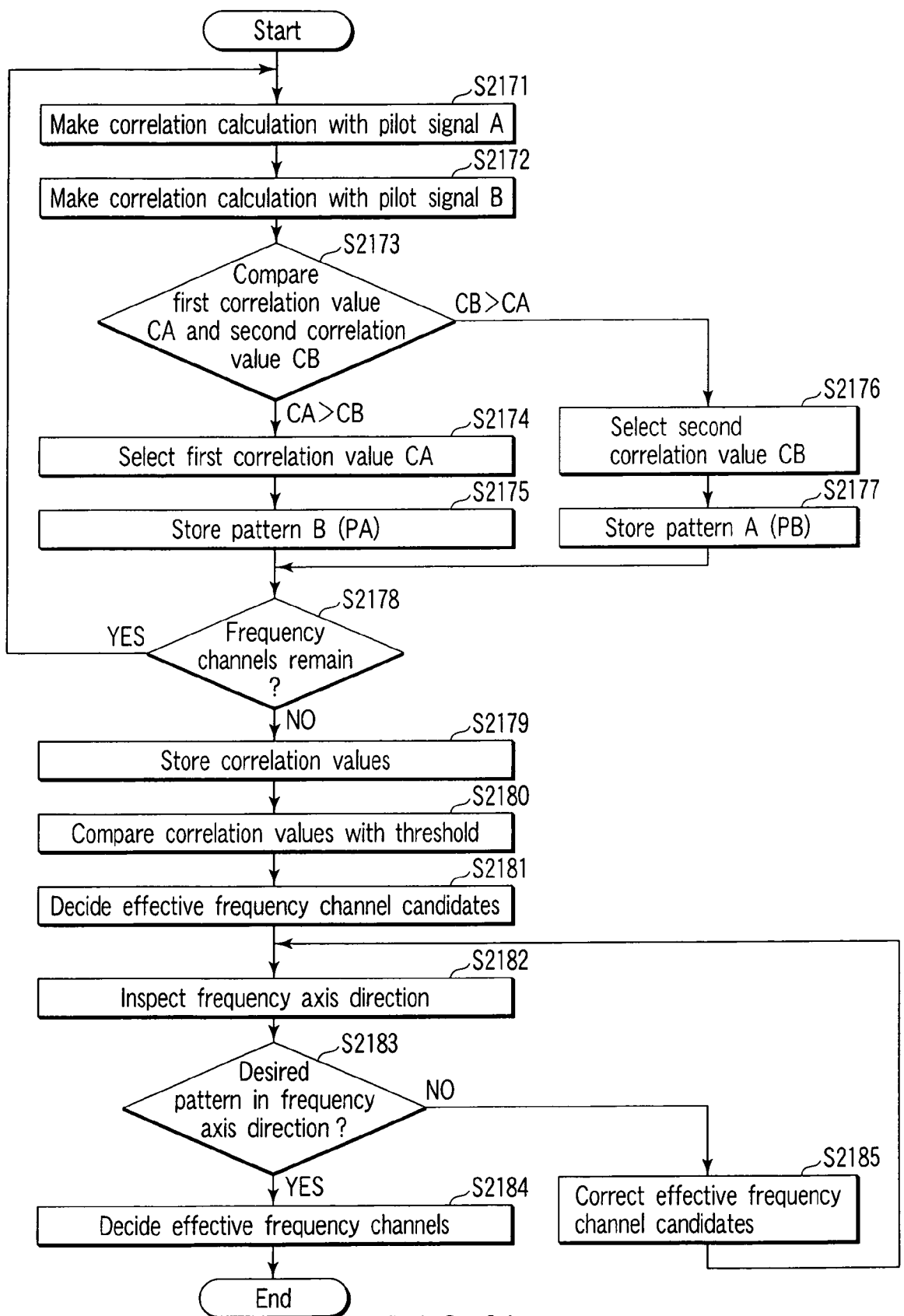
FIG. 21 is a flowchart showing an example of processing executed when the effective frequency channel decision unit determines an effective frequency channel.

An example of the processing executed when the effective frequency channel decision unit 1051 shown in FIG. 20 decides effective frequency channels will be described below with reference to FIG. 21.

The correlation calculation unit 2061 makes a correlation calculation between the received signal and pilot signal A (step S2171), and then a correlation calculation between the received signal and pilot signal B (step S2172). Let CA be the correlation value between the received signal and pilot signal A, and CB be that between the received signal and pilot signal B. Then, the correlation value selection unit 2062 compares CA and CB (step S2173). If CA is larger than CB, the unit 2062 selects CA as the correlation value in this frequency channel (step S2174), and the correlation value storage unit 2063 stores an identifier (PA) of the selected pilot signal A (step S2175). On the other hand, if CB is larger than CA in step S2173, the unit 2062 selects CB as the correlation value of this frequency channel (step S2176), and the correlation value storage unit 2063 stores an identifier (PB) of the selected pilot signal B (step S2177). If CA and CB are equal to each other, the unit 2062 selects an arbitrary pilot signal (step S2173). The processes from step S2171 to S2177 are repeated for all the frequency channels of the predetermined frequency band used to transmit frames in the radio communication system A (step S2178).

The correlation value storage unit 2063 stores the correlation values in respective frequency channels (step S2179). The threshold comparison unit 2064 compares the predetermined threshold value and the correlation value for each frequency channel (step S2180), and selects a frequency channel having a correlation value exceeding the threshold value as an effective frequency channel candidate (step S2181). The effective frequency channel inspection unit 2065 sorts the frequency channels selected as the effective frequency channel candidates in ascending order of frequency, and compares a pattern configured by the identifiers of pilot signals selected for the respective frequency channels with a predetermined identifier pattern (steps S2182 and S2183). If the pattern of the identifiers of the pilot signals of the effective frequency channel candidates matches the predetermined identifier pattern, the unit 2065 determines the effective channel candidates as effective frequency channels, and executes demodulation processing of signals of these frequency channels (step S2184). On the other hand, if the pattern of the identifiers of the pilot signals of the effective frequency channel candidates does not match the predetermined identifier pattern in step S2183, the correction processing of the effective frequency channel candidates is executed (step S2185), thus repeating the processes in step S2182 and subsequent steps.

Figure 22:
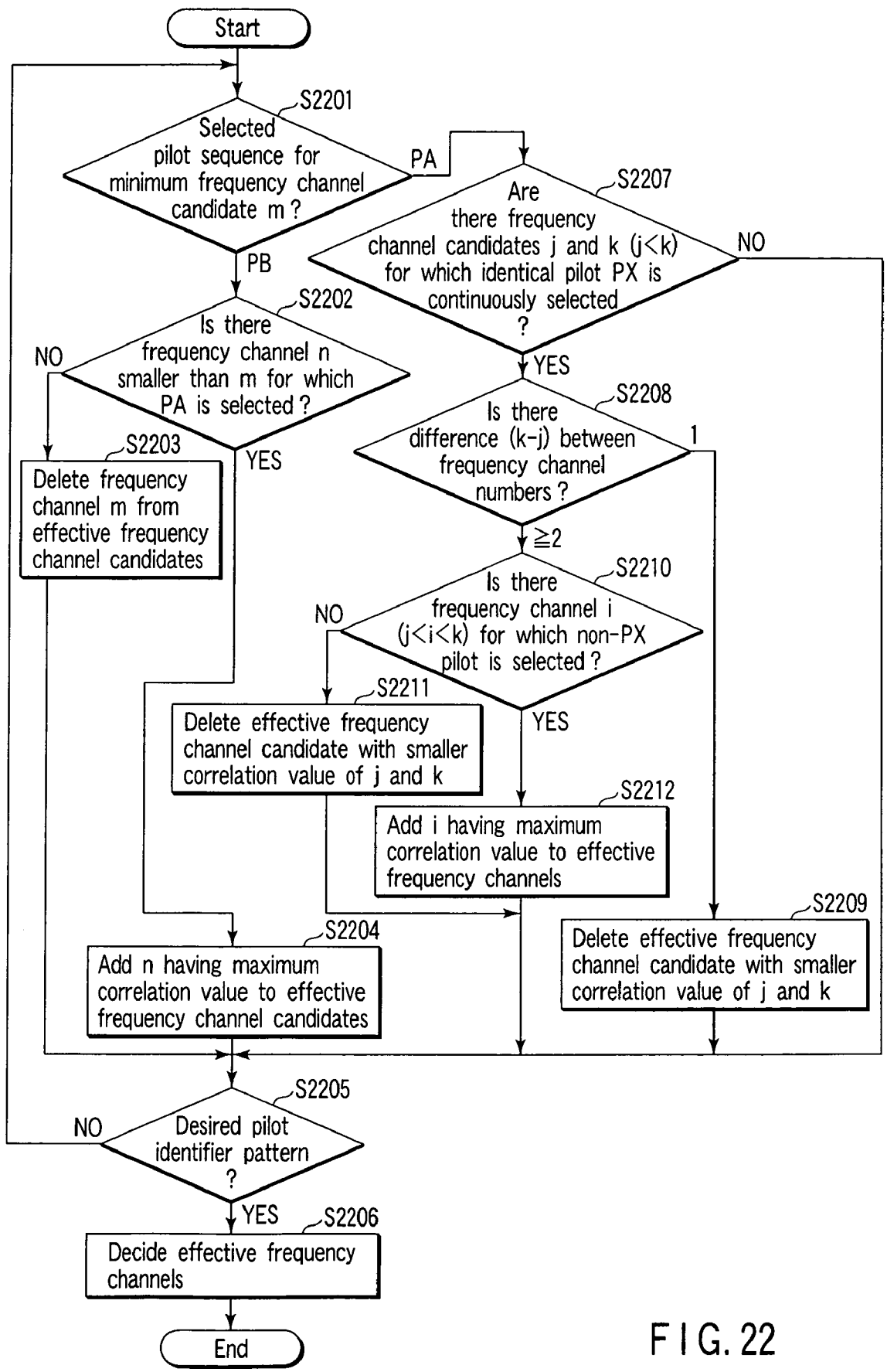
FIG. 22 is a flowchart showing an example of processing executed when the effective frequency channel decision unit corrects an effective frequency channel.

An example of the processing executed when the effective frequency channel correction unit 2066 shown in FIG. 20 will be described below with reference to FIG. 22. A case will be explained wherein signal sequences A and B alternately repetitively appear as shown in FIG. 15 as those used as a pilot signal for effective frequency channel estimation.

The effective frequency channel correction unit 2066 checks if a pilot signal sequence selected for a minimum frequency channel candidate m of the plurality of channels selected as the effective frequency channel candidates is a signal sequence A or B (step S2201). If the signal sequence selected for the minimum effective frequency channel candidate m is B (identifier PB), the unit 2066 checks if there are frequency channels which are smaller than m and for which PA is selected among the predetermined frequency channels (step S2202). If there is no frequency channel n for which the signal sequence A (identifier PA) is selected among those smaller than m, the unit 2066 deletes the frequency channel m from the effective frequency channel candidates (step S2203).

On the other hand, if there are frequency channels n for which the signal sequence A (identifier PA) is selected among those smaller than m in step S2202, the effective frequency channel correction unit 2066 adds a frequency channel with a maximum correlation value of those frequency channels to the effective frequency channel candidates (step S2204). The unit 2066 then checks if the pattern of pilot signals selected for the effective frequency channel candidates corresponds to a repetition of signal sequences A, B, A, . . . as the predetermined pilot signal sequence pattern (step S2205). If the pattern of pilot signals matches the predetermined pattern in step S2205, the unit 2066 determines the effective frequency channel candidates as the effective frequency channels (step S2206); otherwise, the unit 2066 repeats the processes in step S2201 and subsequent steps.

On the other hand, if the signal sequence selected for the minimum effective frequency channel candidate m is A (identifier PA) in step S2201, the effective frequency channel correction unit 2066 checks if identical pilot signal sequences (identifier PX) are continuously selected for frequency channels j and k (j<k) in the effective frequency channel candidates (step S2207). This is the state when the numbers of the effective frequency channels are selected such as 4, 5, . . . , and the pilot signal PA is selected for both the frequency channels of the numbers 4 and 5. If the two frequency channels for which the identical pilot signal sequence is selected among the effective frequency channel candidates are not neighboring ones in step S2207, the unit 2066 executes the processes in step S2205 and subsequent steps.

On the other hand, if the two frequency channels for which the identical pilot signal sequence is selected among the effective frequency channel candidates are neighboring ones, the effective frequency channel correction unit 2066 checks the difference between the frequency channel numbers (step S2208). If the difference between the numbers of the two frequency channels for which the identical pilot signal sequence is selected is "1", the unit 2066 deletes the frequency channel with a lower correlation value of the frequency channels j and k from the effective frequency channel candidates (step S2209), and executes the processes in step S2205 and subsequent steps. If the difference between the numbers of the two frequency channels for which the identical pilot signal sequence is selected is "2" or more, the unit 2066 checks if frequency channels for which a non-PX pilot signal is selected exist between the frequency channels j and k (step S2210). If no frequency channel for which a non-PX pilot signal is selected exists between the frequency channels j and k, the unit 2066 deletes the frequency channel with a lower correlation value of the frequency channels j and k from the effective frequency channel candidates (step S2211), and executes the processes in step S2205 and subsequent steps. On the other hand, if frequency channels for which a non-PX pilot signal is selected exist between the frequency channels j and k, the unit 2066 adds a frequency channel i having a maximum correlation value of these frequency channels to the effective frequency channel candidates (step S2212), and executes the processes in step S2205 and subsequent steps. The unit 2066 then repeats the processes until the pilot pattern of the effective frequency channel candidates matches the predetermined pattern.

As described above, according to the third embodiment, in addition to the effects of the first embodiment, since a predetermined two signal sequences are alternately assigned for respective effective frequency channels to the effective frequency channel estimation pilot signal fields of frames to be transmitted in a plurality of frequency channels, the receiving radio communication apparatus inspects the detected effective frequency channels in the frequency direction while suppressing the processing volume of correlation calculations on the receiving side, and corrects an error if any, thereby improving the precision of effective frequency channel estimation. By executing the processing sequence shown in FIG. 22, the detection precision of effective frequency channels can be improved, thus allowing efficient radio communications.

Fourth Embodiment

This embodiment will explain a practical example of the signal sequences in the third embodiment.

An example of the effective frequency channel estimation pilot signal fields of frames to be transmitted using a plurality of frequency channels by the radio communication apparatus A 105 of this embodiment will be described below with reference to FIG. 23. Assume that the radio communication apparatus A 105 transmits frames using eight frequency channels, i.e., frequency channels B1 (Ch.B1), B2 (Ch.B2), B4 (Ch.B4), B5 (Ch.B5), B6 (Ch.B6), B8 (Ch.B8), B9 (Ch.B9), and B10 (Ch.B10), as in FIG. 13.

Figure 23:
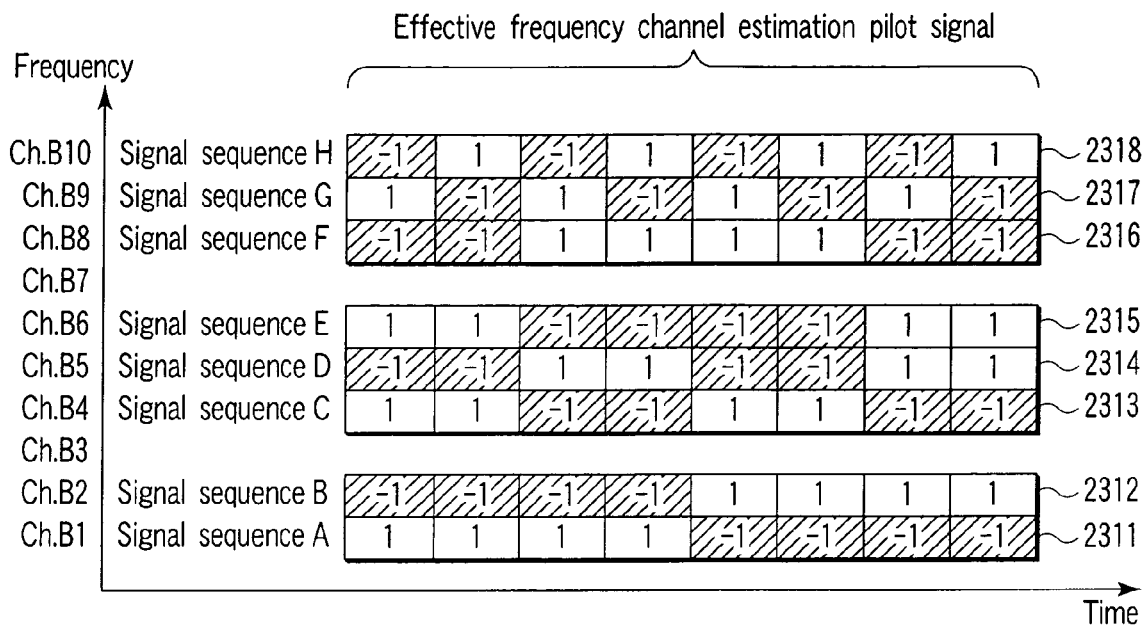
FIG. 23 shows a first example of an effective frequency channel estimation pilot signal field included in a frame of the radio communication system A in the fourth embodiment.

As shown in FIG. 23, a signal sequence A 2311 indicates a signal sequence to be set in an effective frequency channel estimation pilot signal field of a frame to be transmitted using the frequency channel B1. A signal sequence B 2312 indicates a signal sequence to be set in an effective frequency channel estimation pilot signal field of a frame to be transmitted using the frequency channel B2. A signal sequence C 2313 indicates a signal sequence to be set in an effective frequency channel estimation pilot signal field of a frame to be transmitted using the frequency channel B4. A signal sequence D 2314 indicates a signal sequence to be set in an effective frequency channel estimation pilot signal field of a frame to be transmitted using the frequency channel B5. A signal sequence E 2315 indicates a signal sequence to be set in an effective frequency channel estimation pilot signal field of a frame to be transmitted using the frequency channel B6. A signal sequence F 2316 indicates a signal sequence to be set in an effective frequency channel estimation pilot signal field of a frame to be transmitted using the frequency channel B8. A signal sequence G 2317 indicates a signal sequence to be set in an effective frequency channel estimation pilot signal field of a frame to be transmitted using the frequency channel B9. A signal sequence H 2318 indicates a signal sequence to be set in an effective frequency channel estimation pilot signal field of a frame to be transmitted using the frequency channel B10.

For example, a correlation value between the signal sequences A 2311 and G 2317 is given by:

$$1 \times 1 + 1 \times (-1) + 1 \times 1 + 1 \times (-1) + (-1) \times 1 + (-1) \times (-1) + (-1) \times 1 + (-1) \times (-1) = 0 \quad \text{equation (1)}$$

Likewise, all correlation values between two out of signal sequences from the signal sequence A 2311 to the signal sequence G 2318 become zero. That is, the signal sequences from the signal sequence A 2311 to the signal sequence G 2318 are orthogonal to each other in this sense.

Figure 24:
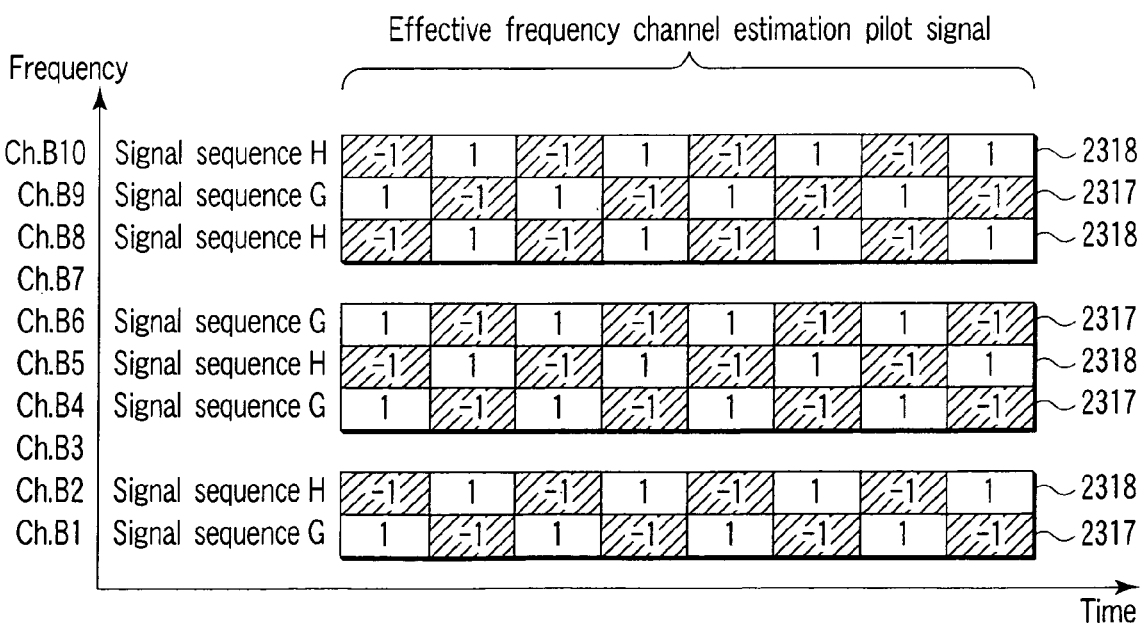
FIG. 24 shows a second example of an effective frequency channel estimation pilot signal field included in a frame of the radio communication system A in the fourth embodiment.

Next, an example of the effective frequency channel estimation pilot signal fields of frames to be transmitted by the radio communication apparatus A 105 using a plurality of frequency channels will be described below with reference to FIG. 24. FIG. 24 shows the signal sequences G 2317 and H 2318 when the two signal sequences G and H are prepared as two signal sequences, as shown in FIG. 15, and are repetitively assigned in turn from frequency channels with lower frequencies.

A correlation value between the signal sequences G 2317 and H 2318 is given by:

$$1 \times (-1) + (-1) \times 1 + 1 \times (-1) + (-1) \times 1 + 1 \times (-1) + (-1) \times 1 + 1 \times (-1) + (-1) \times 1 = 0$$

Thus, pilot signal sequences for effective frequency channel estimation are assigned so that two signal sequences whose correlation value becomes zero neighbor each other.

As described above, according to the fourth embodiment, in addition to the effects of the first embodiment, since signal sequences whose correlation value becomes zero are used as the pilot signal sequences for effective frequency channel estimation, the difference in correlation value for each signal sequence calculated in each individual frequency channel can be increased, thus improving the detection precision of effective frequency channels.

Fifth Embodiment

This embodiment relates to the symbol times of signal sequences in the fourth embodiment.

A first example of the effective frequency channel estimation pilot signal fields of frames to be transmitted by the radio communication apparatus A 105 of this embodiment using a plurality of frequency channels will be described below with reference to FIG. 25. FIG. 25 additionally shows signals to be transmitted by the radio system B 102 in addition to the effective frequency channel estimation pilot signal fields shown in FIG. 24. Therefore, a repetitive description will be avoided.

Referring to FIG. 25, each of reference numerals S3_1 2531, S3_2 2532, S3_3 2533, and S3_4 2534 denotes one symbol of the radio system B 102 to be transmitted in the frequency channel B3. Each of reference numerals S7_1 2535, S7_2 2536, S7_3 2537, and S7_4 2538 denotes one symbol of the radio system B 102 to be transmitted in the frequency channel B7. A time T0 2539 indicates one symbol time of a pilot signal for effective frequency estimation, and a time T1 2540 indicates one symbol time of a signal to be transmitted by the radio apparatus 106.

In the example shown in FIG. 25, one symbol time T0 2539 of the pilot signal for effective frequency channel estimation is set to be ½ of one symbol time T1 2540 of a signal to be transmitted by the radio apparatus 106. Hence, the signal to be transmitted by the radio apparatus 106 is constant within the time T1 2540, while the pilot signal for effective frequency channel estimation changes between two values within the time T1 2540. Hence, the correlation between the pilot signal for effective frequency channel estimation and the signal to be transmitted by the radio apparatus 106 can be suppressed to the minimum.

In the above example, one symbol time T0 2539 of the pilot signal for effective frequency channel estimation is ½ of the time T1 2540 of the signal to be transmitted by the radio apparatus 106. Alternatively, one symbol time T0 2539 of the pilot signal for effective frequency channel estimation may be ⅓, ¼, or the like of the time T1 2540 of the signal to be transmitted by the radio apparatus 106.

In the example shown in FIG. 25, as the relationship between the bandwidth of one frequency channel of the radio communication system A 101 and that of one frequency channel of the radio system B 102, the bandwidth of one frequency channel used in the radio communication system A 101 becomes a multiple of that of one frequency channel of the radio system B 102, as shown in FIG. 17.

A second example of the effective frequency channel estimation pilot signal fields of frames to be transmitted by the radio communication apparatus A 105 of this embodiment using a plurality of frequency channels will be described below with reference to FIG. 26. FIG. 26 additionally shows signals to be transmitted by the radio system B 102 in addition to the effective frequency channel estimation pilot signal fields shown in FIG. 24. Therefore, a repetitive description will be avoided.

Referring to FIG. 26, each of reference numerals S3_1 2651, S3_2 2652, S3_3 2653, S3_4 2654, S3_5 2655, S3_6 2656, S3_7 2657, and S3_8 2658 denotes one symbol of the radio system B 102 to be transmitted in the frequency channel B3. Each of reference numerals S7_1 2659, S7_2 2660, S7_3 2661, S7_4 2662, S7_5 2663, S7_6 2664, S7_7 2665, and S7_8 2666 denotes one symbol of the radio system B 102 to be transmitted in the frequency channel B7. A time T0 2667 indicates one symbol time of a pilot signal for effective frequency estimation, and a time T1 2668 indicates one symbol time of a signal to be transmitted by the radio apparatus 106.

In the example shown in FIG. 26, one symbol time T0 2667 of the pilot signal for effective frequency channel estimation is set to be twice one symbol time T1 2668 of a signal to be transmitted by the radio apparatus 106. Hence, the signal to be transmitted by the radio apparatus 106 changes between two values within the time T0 2667, while the pilot signal for effective frequency channel estimation is constant within the time T0 2667. Hence, the correlation between the pilot signal for effective frequency channel estimation and the signal to be transmitted by the radio apparatus 106 can be suppressed to the minimum.

In the above example, one symbol time T0 2667 of the pilot signal for effective frequency channel estimation is twice the time T1 2668 of the signal to be transmitted by the radio apparatus 106. Alternatively, one symbol time T0 2667 of the pilot signal for effective frequency channel estimation may be three times, four times, or the like the time T1 2668 of the signal to be transmitted by the radio apparatus 106.

In the example shown in FIG. 26, as the relationship between the bandwidth of one frequency channel of the radio communication system A 101 and that of one frequency channel of the radio system B 102, the bandwidth of one frequency channel used in the radio communication system A 101 becomes a fraction of that of one frequency channel of the radio system B 102, as shown in FIG. 18.

In general, a time within which the value of the pilot signal for effective frequency channel estimation need only be different from the symbol time of another radio system.

As described above, according to the fifth embodiment, in addition to the effects of the first embodiment, since the symbol time of the pilot signal for effective frequency channel estimation is set to be different from one symbol time of a signal to be transmitted by the radio apparatus 106, the correlation between these two signals becomes low, thus improving the detection precision of the effective frequency channels.

Sixth Embodiment

This embodiment will explain the arrangement and operation of a radio communication apparatus in the case of an OFDM communication.

An example of a frame format to be transmitted by a radio communication system A including the radio communication apparatus of this embodiment will be described below with reference to FIG. 27.

In the frame format shown in FIG. 27, the effective frequency channel estimation pilot signal field 334 in the frame format shown in FIG. 3 is replaced by an effective subcarrier estimation pilot signal field 2785 configured by effective subcarrier estimation pilot signals 2784, and a channel state estimation pilot signal field 2783 is added to the frame format shown in FIG. 3.

The radio communication apparatus A 105 of this embodiment will be described below with reference to FIG. 28.

Figure 28:
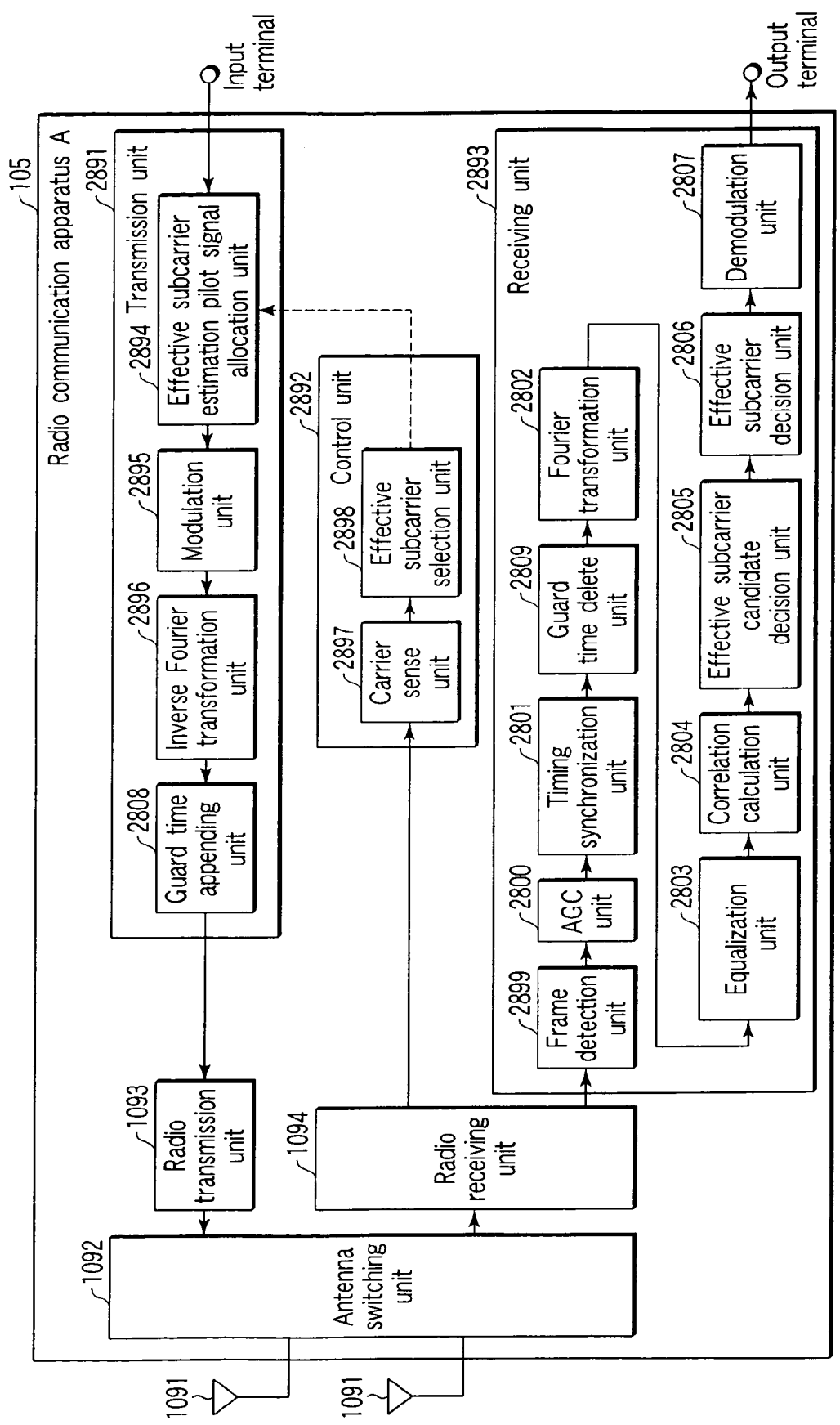
FIG. 28 is a block diagram of a radio communication apparatus of the sixth embodiment.

The radio communication apparatus A 105 shown in FIG. 28 includes the antennas 1091, the antenna switching unit 1092, the radio transmission unit 1093, the radio receiving unit 1094, a transmission unit 2891, a control unit 2892, and a receiving unit 2893. The transmission unit 2891 includes an effective subcarrier estimation pilot signal allocation unit 2894, modulation unit 2895, inverse Fourier transformation unit 2896, and guard time appending unit 2808. The control unit 2892 includes a carrier sense unit 2897 and effective subcarrier selection unit 2898. The receiving unit 2893 includes a frame detection unit 2899, AGC unit 2800, timing synchronization unit 2801, guard time removing unit 2809, Fourier transformation unit 2802, equalization unit 2803, correlation calculation unit 2804, effective subcarrier candidate decision unit 2805, effective subcarrier decision unit 2806, and demodulation unit 2807.

The carrier sense unit 2897 makes carrier sense for a predetermined bandwidth with respect to a signal input via the antenna 1091, antenna switching unit 1092, and radio receiving unit 1094.

The effective subcarrier selection unit 2898 checks based on the carrier sense result input from the carrier sense unit 2897 if an available frequency channel is detected. If an available frequency channel is detected, the unit 2897 selects a subcarrier used to transmit a frame.

The effective subcarrier estimation pilot signal allocation unit 2894 allocates a plurality of types of pilot signals as the effective subcarrier estimation pilot signals 2784 in the effective subcarrier estimation pilot signal field 2785 in accordance with a predetermined assignment pattern.

The frame detection unit 2899 executes frame detection processing of a signal input via the antenna 1091, antenna switching unit 1092, and radio receiving unit 1094, and checks if a frame is detected.

The AGC unit 2800 executes AGC of an input signal upon detection of a frame, and adjusts that signal to an appropriate amplitude value.

The timing synchronization unit 2801 executes timing synchronization. The timing synchronization unit 2801 makes a correlation calculation between a known signal sequence and receiving signal to detect a peak of correlation values, thus adjusting the timing to a receiving frame.

The correlation calculation unit 2804 makes a correlation calculation between signals in the effective subcarrier estimation pilot signal field of a signal that has undergone equalization processing and predetermined effective subcarrier estimation pilot signals, and compares the calculated correlation values with a threshold value.

The effective subcarrier candidate decision unit 2805 determines effective subcarrier candidates based on the threshold comparison result.

The effective subcarrier decision unit 2806 inspects the predetermined pilot signal assignment pattern and the assignment pattern of pilot signals selected as effective subcarrier candidates. When the two assignment patterns do not match, the unit 2806 corrects the effective subcarrier candidates to determine final effective subcarriers.

The remaining apparatus components are known to those who are skilled in the art, and a description thereof will not be given.

Figure 29:
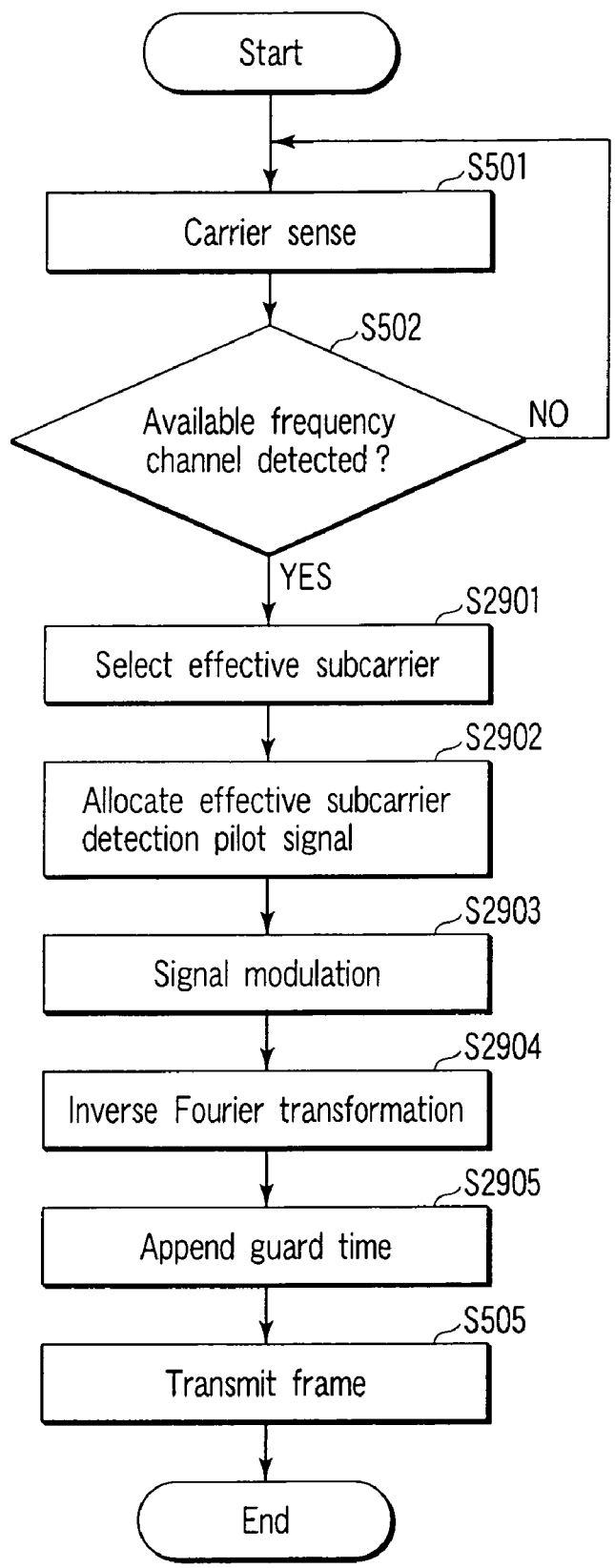
FIG. 29 is a flowchart showing an example of processing executed when the radio communication apparatus shown in FIG. 28 transmits a signal.

An example of the processing executed when the radio communication apparatus shown in FIG. 28 transmits a signal will be described below with reference to FIG. 29.

The carrier sense unit 2897 shown in FIG. 28 executes carrier sense for a predetermined bandwidth with respect to a signal input via the antenna 1091, antenna switching unit 1092, and radio receiving unit 1094, and outputs the result to the effective subcarrier selection unit 2898 (step S501). The effective subcarrier selection unit 2898 checks, based on the carrier sense result input from the carrier sense unit 2897, if an available frequency channel is detected (step S502). If an available frequency channel is detected, the unit 2898 selects a subcarrier used to transmit a frame, and outputs the selected subcarrier to the transmission unit 2891 (step S2901). If no available frequency channel is detected, the process in step S501 is repeated.

The effective subcarrier estimation pilot signal allocation unit 2894 in the transmission unit 2891 allocates a plurality of types of pilot signals as the effective subcarrier estimation pilot signals 2784 in the effective subcarrier estimation pilot signal field 2785 of the frame shown in FIG. 27 in accordance with the predetermined assignment pattern (step S2902). The inverse Fourier transformation unit 2896 applies inverse Fourier transformation to the frame shown in FIG. 27, which is set with the AGC pilot signals 332, time synchronization pilot signals 333, and channel state estimation pilot signals 2783 in addition to the effective subcarrier estimation pilot signals, together with the data 335 modulated by the modulation unit 2895 (step S2903) (step S2904). The guard time appending unit 2808 appends a guard time to the Fourier-transformed frame (step S2905), thus transmitting the frame via the radio transmission unit 1093, antenna switching unit 1092, and antenna 1091 (step S505).

Figure 30:
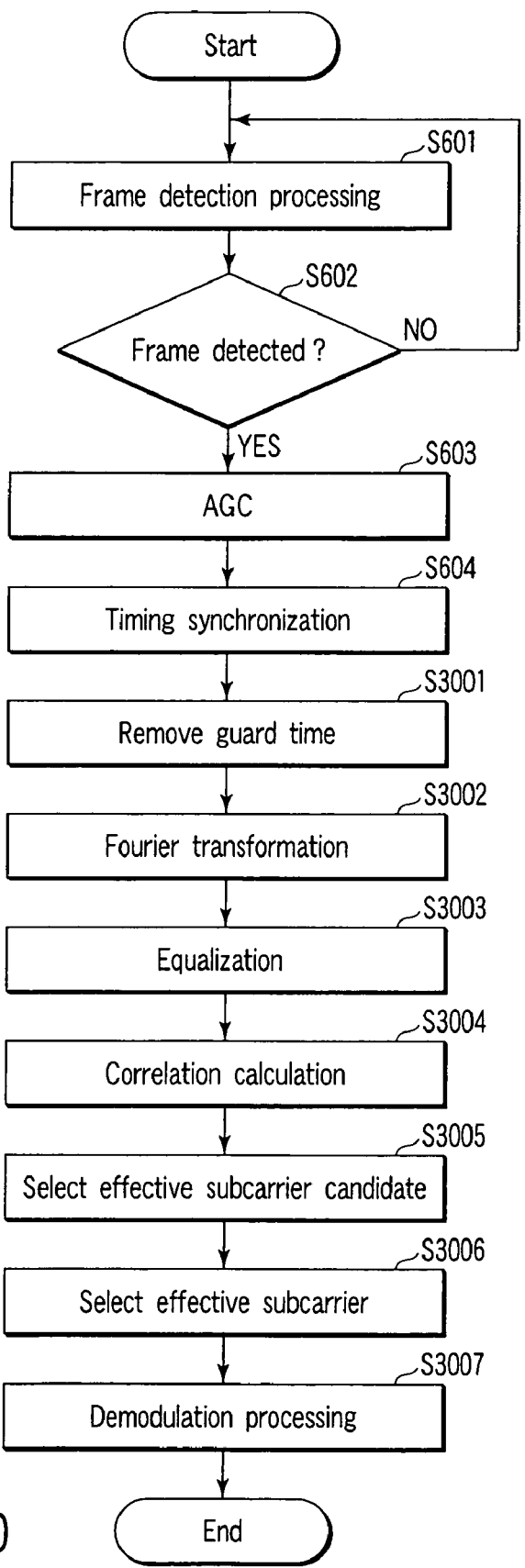
FIG. 30 is a flowchart showing an example of processing executed when the radio communication apparatus shown in FIG. 28 receives a signal.

An example of the processing executed when the radio communication apparatus shown in FIG. 28 receives a signal will be described below with reference to FIG. 30.

The frame detection unit 2899 shown in FIG. 28 executes frame detection processing of a signal input via the antenna 1091, antenna switching unit 1092, and radio receiving unit 1094 (step S601), and checks if a frame is detected (step S602). If a frame is detected, the AGC unit 2800 executes the AGC of the input signal (step S603), and the timing synchronization unit 2801 executes timing synchronization of the signal which has been adjusted to an appropriate amplitude value by the AGC (step S604). On the other hand, if no frame is detected in step S602, the frame detection processing (step S601) and subsequent processes are repeated. The timing synchronization processing is implemented by marking correlation calculations between known signal sequences and the receiving signal, and detecting a peak of correlation values, thereby adjusting the timing to the receiving frame.

The guard time removing unit 2809 removes a guard time from the signal, timing synchronization of which has been established (step S3001), and the Fourier transformation unit 2802 applies Fourier transformation to the signal from which the guard time is removed (step S3002). The equalization unit 2803 applies equalization processing to the Fourier-transformed signal (step S3003). The correlation calculation unit 2804 makes a correlation calculation between signals in the effective subcarrier estimation pilot signal field of the signal that has undergone the equalization processing, and predetermined effective subcarrier estimation pilot signals, and compares the calculated correlation values with a threshold value (step S3004). The effective subcarrier candidate decision unit 2805 determines effective subcarrier candidates based on the threshold comparison result in step S3004 (step S3005). The effective subcarrier decision unit 2806 inspects the predetermined pilot signal assignment pattern and the assignment pattern of pilot signals selected as the effective subcarrier candidates. If the two assignment patterns do not match, the unit 2806 corrects the effective subcarrier candidates to determine final effective subcarriers (step S3006). The demodulation unit 2807 executes demodulation processing of subcarriers determined as the effective subcarriers (step S3007).

An example of the processing executed when two types of pilot signal sequences are alternately assigned to effective subcarriers as effective subcarrier estimation pilot signals, and the correlation calculation unit 2804, effective subcarrier candidate decision unit 2805, and effective subcarrier decision unit 2806 shown in FIG. 28 determine the effective subcarriers will be described below with reference to FIG. 31.

The correlation calculation unit 2804 shown in FIG. 28 makes, for respective subcarriers, a correlation calculation between a received subcarrier signal and pilot signal A (step S2171), and then that between a received subcarrier signal and a pilot signal B (step S2172). Let CA be the correlation value between the received subcarrier signal and pilot signal A, and CB be the correlation value between the received subcarrier signal and pilot signal B. Then, the unit 2804 compares CA and CB (step S2173). If CA is larger than CB, the unit 2804 selects CA as the correlation value of this subcarrier (step S2174), and the effective subcarrier candidate decision unit 2805 stores an identifier (PA) of the selected pilot signal A (step S2175). On the other hand, if CB is larger than CA in step S2173, the unit 2804 selects CB as the correlation value of this subcarrier (step S2176), and the effective subcarrier candidate decision unit 2805 stores an identifier (PB) of the selected pilot signal B (step S2177). If CA and CB are equal to each other, the unit 2804 selects an arbitrary pilot signal (step S2173).

The processes from steps S2171 to S2177 are repeated for all predetermined subcarriers used to transmit frames in the radio communication system A (step S3151). Subsequently, the correlation values for respective subcarriers are stored (step S2179), and a predetermined threshold value is compared with the correlation values for respective subcarriers (step S2180), thus selecting subcarriers having correlation values exceeding the threshold value as effective subcarrier candidates (step S3152). The subcarriers selected as the effective subcarrier candidates are sorted in ascending order of frequency, and a pattern configured by the identifiers of pilot signals selected for respective subcarriers is compared with a predetermined identifier pattern (steps S2182 and S2183). If the pattern of the identifiers of the pilot signals of the effective subcarrier candidates matches the predetermined identifier pattern, the effective subcarrier candidates are determined as effective subcarriers, and the subcarrier signals undergo demodulation processing (step S3153). On the other hand, if the pattern of the identifiers of the pilot signals of the effective subcarrier candidates does not match the predetermined identifier pattern in step S2183, the effective subcarrier candidate undergo correction processing (step S3154), thus repeating the processes in step S2182 and subsequent steps.

An example of the processing executed when the effective subcarrier decision unit 2806 shown in FIG. 28 determines effective subcarriers will be described below with reference to FIG. 32. A case will be explained below wherein signal sequences A and B alternatively repetitively appear as those used as effective subcarrier estimation pilot signals, as shown in FIG. 15.

The effective subcarrier decision unit 2806 checks if a pilot signal sequence selected for a minimum effective subcarrier candidate m of a plurality of subcarriers selected as the effective subcarrier candidates is a signal sequence A or B (step S3201). If the signal sequence selected for the minimum effective subcarrier candidate m is B (identifier PB), the unit 2806 checks if there are subcarriers which are smaller than m and for which PA is selected among the predetermined subcarriers (step S3202). If there is no subcarrier n for which the signal sequence A (identifier PA) is selected among those smaller than m, the unit 2806 deletes the subcarrier m from the effective subcarrier candidates (step S3203). On the other hand, if there are subcarriers n for which the signal sequence A (identifier PA) is selected among those smaller than m in step S3202, the unit 2806 adds a subcarrier with a maximum correlation value of those subcarriers to the effective subcarrier candidates (step S3204).

The effective subcarrier decision unit 2806 then checks if the pattern of pilot signals selected for the effective subcarrier candidates corresponds to a repetition of signal sequences A, B, A, . . . as the predetermined pilot signal sequence pattern (step S3205). If the pattern of pilot signals matches the predetermined pattern, the unit 2806 determines the effective subcarrier candidates as the effective subcarriers (step S3206); otherwise, the unit 2806 repeats the processes in step S3201 and subsequent steps. On the other hand, if the signal sequence selected for the minimum effective subcarrier candidate m is A (identifier PA) in step S3201, the unit 2806 checks if identical pilot signal sequences (identifier PX) are continuously selected for subcarriers j and k (j<k) in the effective subcarrier candidates (step S3207). This is the state when the numbers of the effective subcarriers are selected such as 4, 5, . . . , and both the subcarriers of the numbers 4 and 5 select the pilot signal PA. If the two subcarriers for which the identical pilot signal sequence is selected among the effective subcarrier candidates are not neighboring ones in step S3207, the unit 2806 executes the processes in step S3205 and subsequent steps.

On the other hand, if the two subcarriers for which the identical pilot signal sequence is selected among the effective subcarrier candidates are neighboring ones, the effective subcarrier decision unit 2806 checks the difference between the subcarrier numbers (step S3208). If the difference between the numbers of the two subcarriers for which the identical pilot signal sequence is selected is "1", the unit 2806 deletes the subcarrier with a lower correlation value of the subcarriers j and k from the effective subcarrier candidates (step S3209), and executes the processes in step S3205 and subsequent steps. If the difference between the numbers of the two subcarriers for which the identical pilot signal sequence is selected is "2" or more, the unit 2806 checks if subcarriers for which a non-PX pilot signal is selected exist between the subcarriers j and k (step S3210). If no subcarrier for which a non-PX pilot signal is selected exists between the subcarriers j and k, the unit 2806 deletes the subcarrier with a lower correlation value of the subcarriers j and k from the effective subcarrier candidates (step S3211), and executes the processes in step S3205 and subsequent steps. On the other hand, if subcarriers for which a non-PX pilot signal is selected exist between the subcarriers j and k, the unit 2806 adds a subcarrier i having a maximum correlation value of these subcarriers to the effective subcarrier candidates (step S3212), and executes the processes in step S3205 and subsequent steps. The unit 2806 then repeats the processes until the pilot pattern of the effective subcarrier candidates matches the predetermined pattern.

As described above, according to the sixth embodiment, in addition to the effects of the first embodiment, a part of an OFDM signal frame to be transmitted by the radio communication system A 101 includes a field used to allocate a predetermined pilot signal sequence required to identify a subcarrier which is selected by the transmitting radio communication apparatus of the radio communication system A based on the carrier sense result. Hence, even when the receiving radio communication apparatus which belongs to the radio communication system A does not know a subcarrier used to transmit a frame, it can detect the subcarrier used to transmit the frame by detecting this pilot signal, and can make a radio communication by demodulating data.

By assigning a plurality of types of pilot signal sequences to effective subcarriers according to the predetermined assignment pattern as pilot signals required to detect subcarriers used to transmit frames, the detection precision of the effective subcarriers can be enhanced, thus improving the communication performance.

Figure 32:
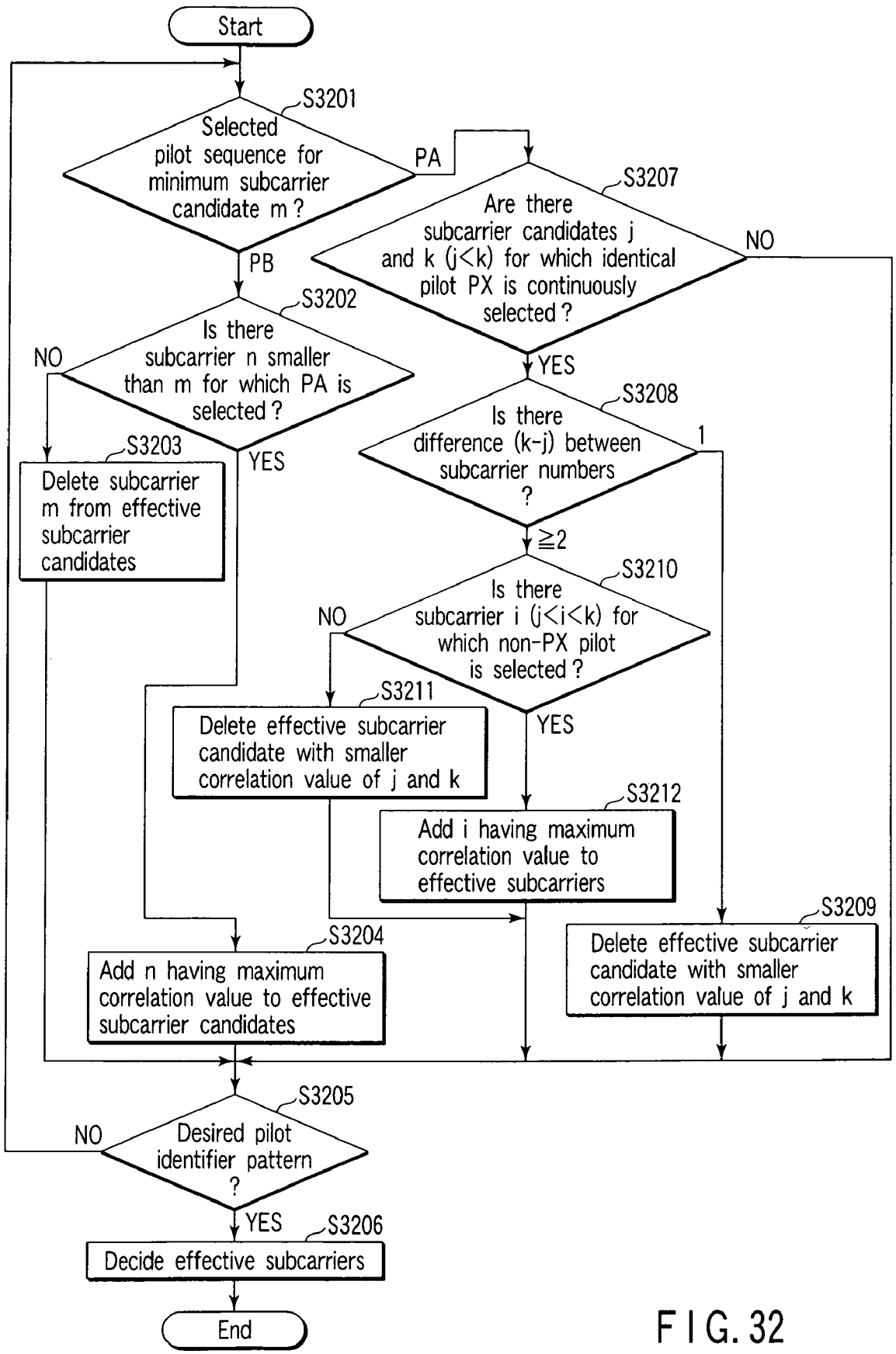
FIG. 32 is a flowchart showing an example of processing executed when the effective subcarrier decision unit shown in FIG. 28 determines an effective subcarrier.

Furthermore, by executing the processing sequence shown in FIG. 32, the detection precision of the effective subcarriers can be improved, and efficient radio communications can be made.

Seventh Embodiment

This embodiment is a modification of the sixth embodiment, and is substantially the same as the sixth embodiment, except that the carrier sense unit and correlation calculation unit are connected.

The radio communication apparatus A 105 of this embodiment will be described below with reference to FIG. 33.

The radio communication apparatus of this embodiment is substantially the same as that of the sixth embodiment, except that the carrier sense unit and correlation calculation unit are connected via a control line. A correlation calculation unit 3301 and carrier sense unit 3302 will be described later with reference to FIGS. 35 and 36.

The timings of frame transmission and receiving made by two radio communication apparatuses A1 and A2 which belong to the radio communication system A 101 will be described below with reference to FIG. 34.

As shown in FIG. 34, assume that frame transmission and receiving are made by the two radio communication apparatuses A1 and A2 with reference to slots 3401, 3402, 3403, and 3404. Also, assume that one slot is divided at a predetermined ratio into carrier sense periods 3405, 3407, 3409, 3411, 3413, 3415, 3417, and 3419, and frame transmission and receiving periods 3406, 3408, 3410, 3412, 3414, 3416, 3418, and 3420. In the example shown in FIG. 34, the right of transmission of the slots 3401 and 3403 is assigned to the radio communication apparatus A1, and that of the slots 3402 and 3404 is assigned to the radio communication apparatus A2.

These rights of transmission are described in schedule information included in a beacon or the like although not shown. As shown in FIG. 34, for example, in the slot0 3401 where the receiving slot is assigned to the radio communication apparatus A2, the radio communication apparatus A2 performs carrier sense (period 3407), and excludes subcarriers corresponding to frequency channels from which carriers are detected during the carrier sense period 3407 of the slot0 3401 from effective subcarrier candidates. Normally, the radio communication apparatus to which the right of transmission is assigned performs the carrier sense, and transmits a frame using a subcarrier corresponding to a frequency channel from which no carrier is detected. However, since the receiving radio communication apparatus performs carrier sense during this carrier sense period, it can exclude subcarriers corresponding to the frequency channels from which carriers are detected from effective subcarrier candidates.

Figure 35:
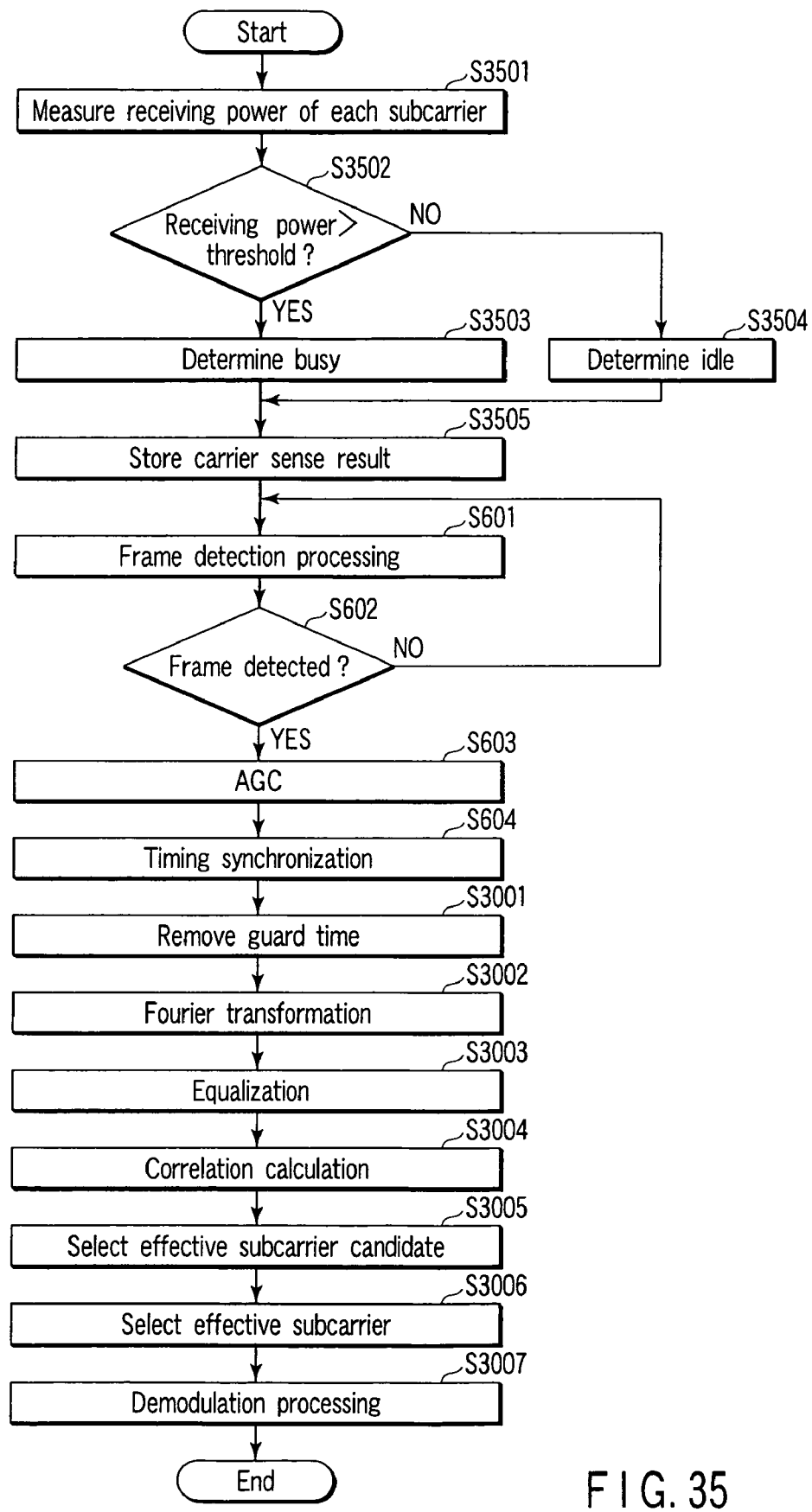
FIG. 35 is a flowchart showing an example of processing executed when the radio communication apparatus shown in FIG. 33 receives a signal.

An example of the processing executed when the radio communication apparatus shown in FIG. 33 receives a signal will be described below with reference to FIG. 35. FIG. 35 is a modification of the flowchart shown in FIG. 30. Note that the following description will be given under the assumption that the radio communication apparatus A 105 of this embodiment is the radio communication apparatus A2 shown in FIG. 34.

The carrier sense unit 3302 shown in FIG. 33 measures the receiving powers of respective subcarriers during the carrier sense periods 3407 and 3415 of the receiving slots (slot0 and slot2 in FIG. 34) (step S3501). The unit 3302 compares the receiving power of each subcarrier with a predetermined threshold value (step S3502). If the receiving power is higher than the threshold value, the unit 3302 determines that this frequency channel is busy (step S3503). On the other hand, if the receiving power is equal to or lower than the threshold value, the unit 3302 determines that this subcarrier is idle (step S3504). The unit 3302 outputs the carrier sense results of the respective subcarriers and the receiving powers during the carrier sense periods to the correlation calculation unit 3301, which stores the carrier sense results and receiving powers during the carrier sense periods in an internal storage unit (not shown) (step S3505). After that, the processes in step S601 and subsequent steps in FIG. 30 are executed.

Figure 36:
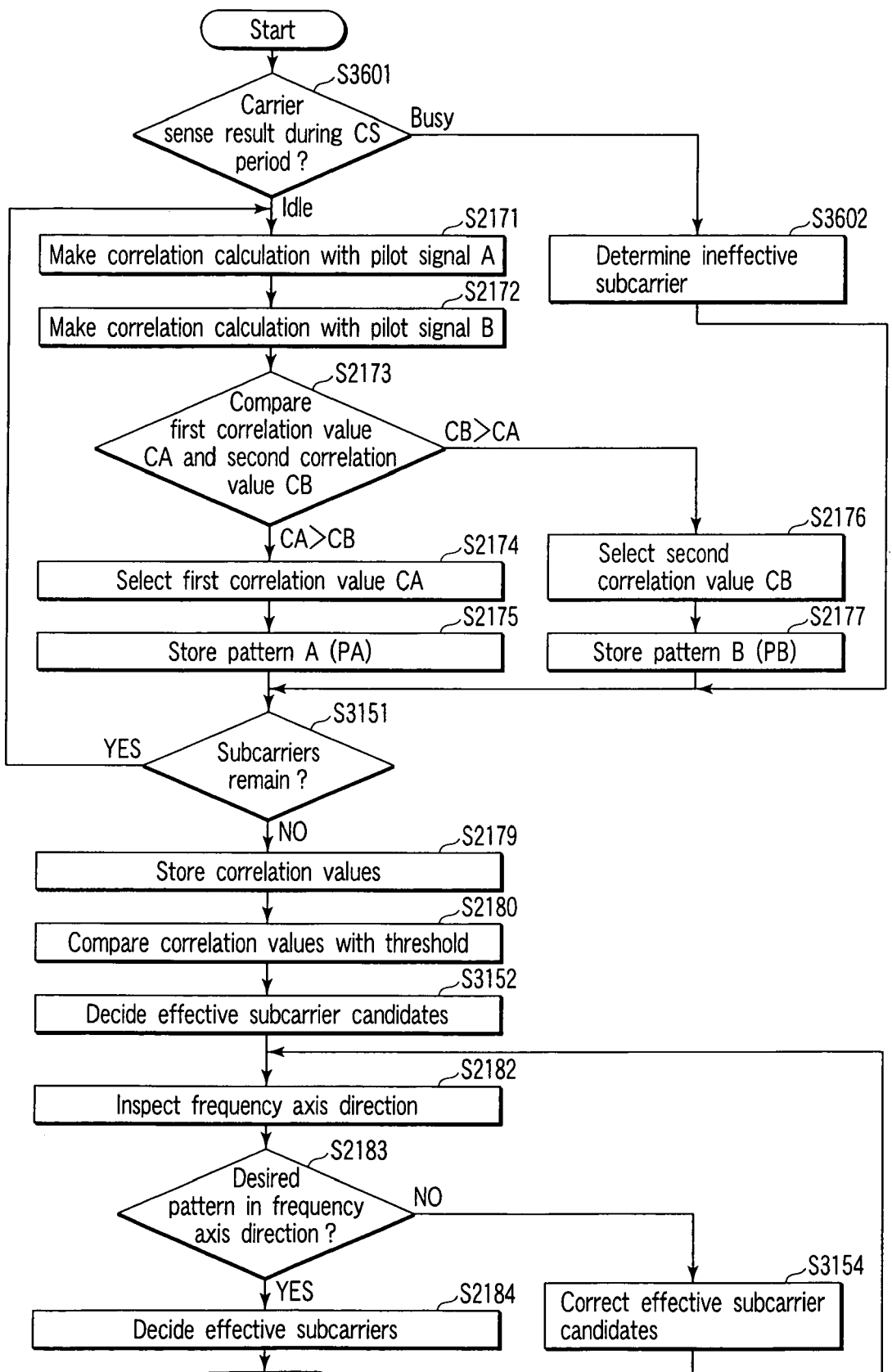
FIG. 36 is a flowchart showing an example of processing executed when the radio communication apparatus shown in FIG. 33 determines an effective subcarrier.

The processing executed when two types of pilot signal sequences are alternately assigned to effective subcarriers as effective subcarrier estimation pilot signals and the radio communication apparatus A 105 shown in FIG. 33 determines effective subcarriers will be described below with reference to FIG. 36. FIG. 36 is a modification of the flowchart shown in FIG. 31.

The correlation calculation unit 3301 shown in FIG. 33 checks for each subcarrier if the carrier sense result during the carrier sense periods is idle or busy (step S3601). If the carrier sense result during the carrier sense periods is busy, the unit 3301 determines that this subcarrier is an ineffective subcarrier (step S3602). On the other hand, if the carrier sense result during the carrier sense periods is idle, the unit 3301 repeats the processes in step S2171 and subsequent steps shown in FIG. 31.

Figure 37:
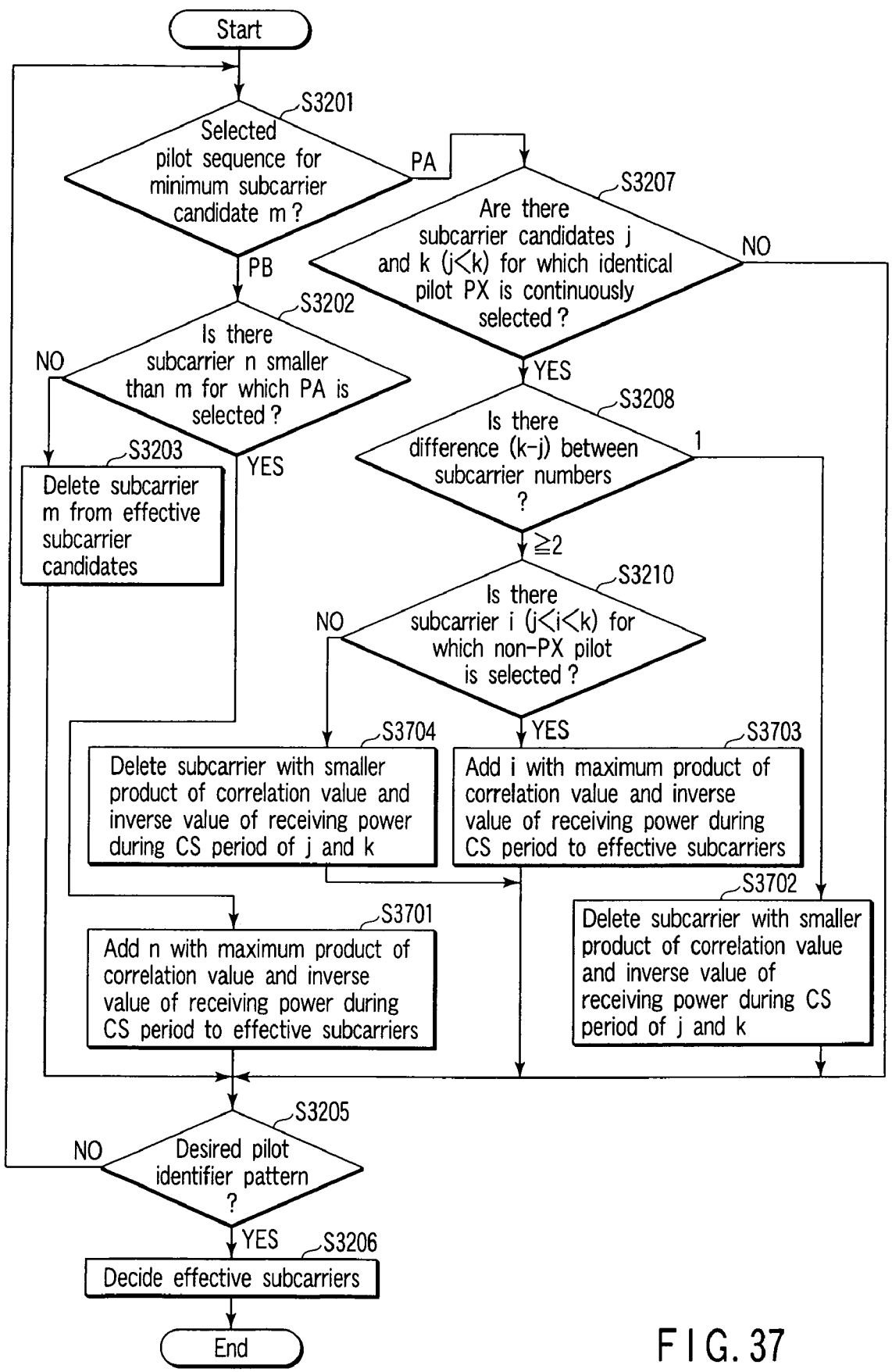
FIG. 37 is a flowchart showing an example of processing executed when the radio communication apparatus shown in FIG. 33 corrects an effective subcarrier.

An example of the processing executed when the effective subcarrier decision unit 2806 shown in FIG. 33 corrects effective subcarriers will be described below with reference to FIG. 37. FIG. 37 is a modification of the flowchart shown in FIG. 32.

The effective subcarrier decision unit 2806 checks if a pilot signal sequence selected for a minimum effective subcarrier candidate m of a plurality of subcarriers selected as the effective subcarrier candidates is a signal sequence A or B (step S3201). If the signal sequence selected for the minimum effective subcarrier candidate m is B (identifier PB), the unit 2806 checks if there are subcarriers which are smaller than m and for which PA is selected among the predetermined subcarriers (step S3202). If there is no subcarrier n for which the signal sequence A (identifier PA) is selected among those smaller than m, the unit 2806 deletes the subcarrier m from the effective subcarrier candidates (step S3203). On the other hand, if there are subcarriers n for which the signal sequence A (identifier PA) is selected among those smaller than m in step S3202, the unit 2806 adds a subcarrier with a maximum product of the correlation value and the inverse of the receiving power during the carrier sense periods of those subcarriers to the effective subcarrier candidates (step S3701).

The effective subcarrier decision unit 2806 then checks if the pattern of pilot signals selected for the effective subcarrier candidates corresponds to a repetition of signal sequences A, B, A, . . . as the predetermined pilot signal sequence pattern (step S3205). If the pattern of pilot signals matches the predetermined pattern, the unit 2806 determines the effective subcarrier candidates as the effective subcarriers (step S3206); otherwise, the unit 2806 repeats the processes in step S3201 and subsequent steps. On the other hand, if the signal sequence selected for the minimum effective subcarrier candidate m is A (identifier PA) in step S3201, the unit 2806 checks if identical pilot signal sequences (identifier PX) are continuously selected for subcarriers j and k (j<k) in the effective subcarrier candidates (step S3207). This is the state when the numbers of the effective subcarriers are selected such as 4, 5, . . . , and the pilot signal PA is selected for both the subcarriers of the numbers 4 and 5. If the two subcarriers for which the identical pilot signal sequence is selected among the effective subcarrier candidates are not neighboring ones in step S3207, the unit 2806 executes the processes in step S3205 and subsequent steps.

On the other hand, if the two subcarriers for which the identical pilot signal sequence is selected among the effective subcarrier candidates are neighboring ones, the effective subcarrier decision unit 2806 checks the difference between the subcarrier numbers (step S3208). If the difference between the numbers of the two subcarriers for which the identical pilot signal sequence is selected is "1", the unit 2806 deletes the subcarrier with a smaller product of the correlation value and the inverse of the receiving power during the carrier sense periods of the subcarriers j and k from the effective subcarrier candidates (step S3702), and executes the processes in step S3205 and subsequent steps. If the difference between the numbers of the two subcarriers for which the identical pilot signal sequence is selected is "2" or more, the unit 2806 checks if subcarriers for which a non-PX pilot signal is selected exist between the subcarriers j and k (step S3210). If no subcarrier for which a non-PX pilot signal is selected exists between the subcarriers j and k, the unit 2806 deletes the subcarrier with a smaller product of the correlation value and the inverse of the receiving power during the carrier sense periods of the subcarriers j and k from the effective subcarrier candidates (step S3703), and executes the processes in step S3205 and subsequent steps.

On the other hand, if subcarriers for which a non-PX pilot signal is selected exist between the subcarriers j and k, the effective subcarrier decision unit 2806 adds a subcarrier i having a maximum product of the correlation value and the inverse of the receiving power during the carrier sense periods of these subcarriers to the effective subcarrier candidates (step S3703), and executes the processes in step S3205 and subsequent steps. The unit 2806 then repeats the processes until the pilot pattern of the effective subcarrier candidates matches the predetermined pattern.

Figure 31:
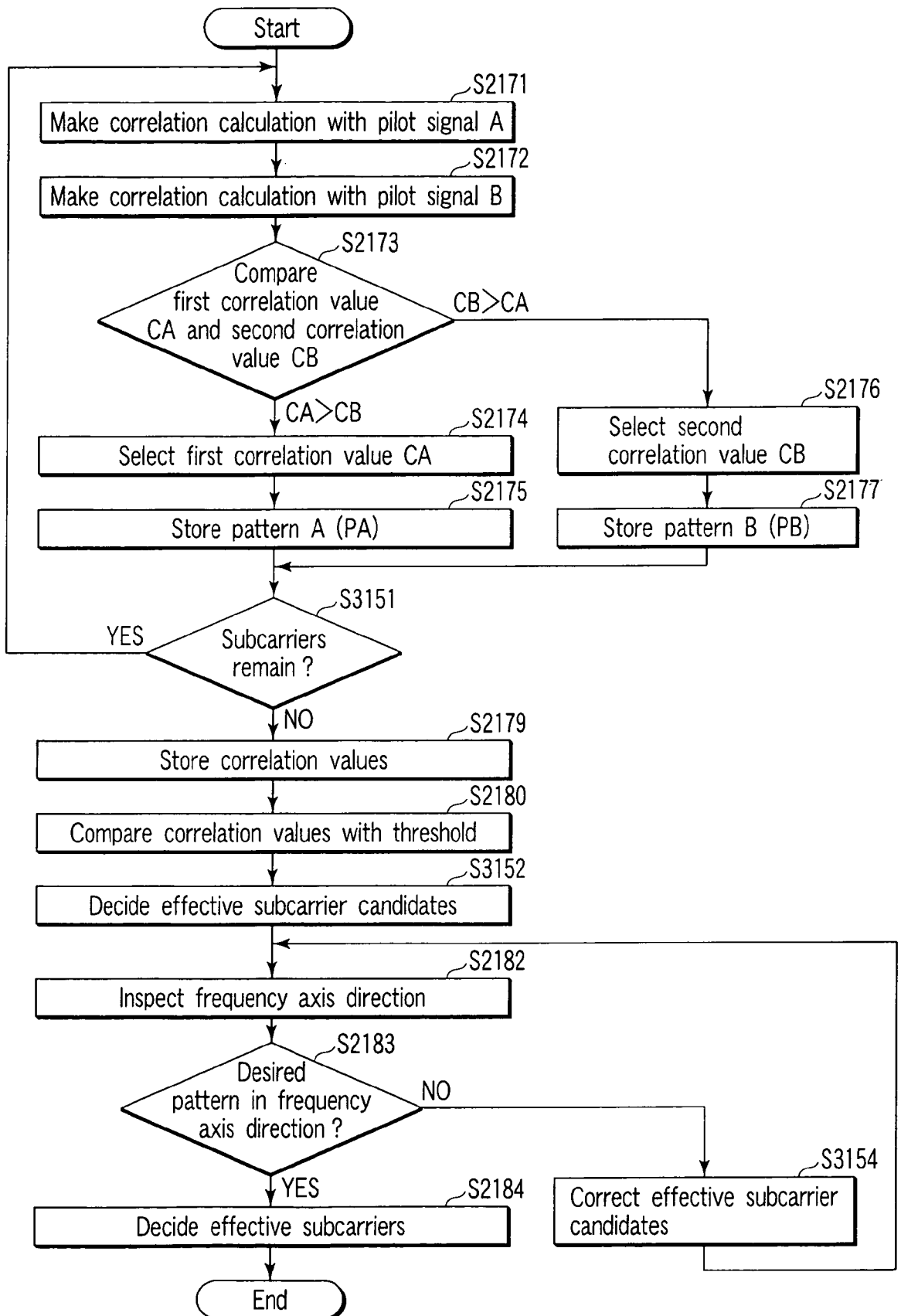
FIG. 31 is a flowchart showing an example of processing executed when a correlation calculation unit, effective subcarrier candidate decision unit, and effective subcarrier decision unit shown in FIG. 28 determine an effective subcarrier.

Upon determination of the effective subcarriers, when the network radius of the radio communication system A is smaller than a predetermined threshold value, a combination of the processes shown in FIGS. 35, 36, and 32 may be selected; when the network radius of the radio communication system A is equal to or larger than the predetermined threshold value, a combination of the processes shown in FIGS. 35, 31, and 37 may be selected.

As described above according to the seventh embodiment, in addition to the effects of the first embodiment, by performing carrier sense during the carrier sense period of the receiving slot, the detection precision of the effective subcarriers can be improved, and efficient radio communications can be made.

When the carrier sense result during the carrier sense period in a certain subcarrier is busy, the receiving side predicts that the transmitting side does not select this subcarrier as an effective subcarrier, and determines that this subcarrier is an ineffective subcarrier, thus allowing effective subcarrier determination with high precision.

Furthermore, by determining an effective subcarrier by combining the correlation value with the effective subcarrier detection pilot signals and the receiving power during the carrier sense period, effective subcarrier determination with high precision can be assured.

As described above, according to the embodiments, even when the receiving radio communication apparatus does not know a frequency channel selected by the transmitting radio communication apparatus to transmit a frame, and that frame, the effective frequency channel detection pilot signals that allow the receiving radio communication apparatus to detect it are allocated in the transmission frame. Thus, the receiving radio communication apparatus detects the frequency channel used to transmit the frame, and that frame, and demodulates data to make a radio communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus which uses a first radio communication system that makes a radio communication by sharing frequencies with a second radio communication system, the apparatus comprising:
 a detection unit configured to detect an available frequency channel which fails to be used by the second radio communication system in a frequency band used by the first radio communication system; and
 a transmission unit configured to transmit, using the available frequency channel, a frame which includes a signal sequence which is used to identify whether or not the frame is transmitted by a radio communication terminal belonging to the first radio communication system by detecting the available frequency channel, the signal sequence being predetermined for the first radio communication system.

2. A radio communication apparatus which uses a first radio communication system that makes a radio communication by sharing frequencies with a second radio communication system, the apparatus comprising:
 a receiving unit configured to receive a frame from a radio communication terminal belonging to the first radio communication system;
 a gain control unit configured to control gain of the frame;
 a synchronization unit configured to establish timing synchronization of the gain-controlled frame to obtain a synchronized frame;
 a calculation unit configured to calculate a correlation value between the synchronized frame and a signal sequence which is used to identify whether or not the received frame is transmitted by the radio communication terminal by detecting an available frequency channel, the signal sequence being predetermined for the first radio communication system; and
 a determination unit configured to determine, when the correlation value exceeds a threshold value, that the received frame is transmitted by the radio communication terminal by detecting the available frequency channel.

3. A radio communication apparatus which uses a first radio communication system that makes a radio communication by sharing frequencies with a second radio communication system, the apparatus comprising:
 a detection unit configured to detect an available frequency channel which fails to be used by the second radio communication system in a frequency band used by the first radio communication system;
 a selection unit configured to select, when the available frequency channel is detected, the available frequency channel as a transmission frequency channel used to transmit a transmission frame;
 an allocation unit configured to allocate, in a part of the transmission frame, a signal sequence which is used to identify whether or not a first frame is transmitted by a radio communication terminal belonging to the first radio communication system by detecting an available frequency channel, the signal sequence being predetermined for the first radio communication system;
 a transmission unit configured to transmit the allocated transmission frame using the transmission frequency channel;
 a receiving unit configured to receive a second frame from the radio communication terminal;
 a gain control unit configured to control gain of the second frame;
 a synchronization unit configured to establish timing synchronization of the gain-controlled frame to obtain a synchronized frame;
 a calculation unit configured to calculate a correlation value between the synchronized frame and the signal sequence; and
 a determination unit configured to determine, when the correlation value exceeds a threshold value, that the received frame is the first frame which is transmitted by the radio communication terminal by detecting the available frequency channel.

4. The apparatus according to claim 3, wherein the selection unit selects a plurality of transmission frequency channels used to concurrently transmit frames, and
 the allocation unit allocates different signal sequences for respective selected transmission frequency channels in accordance with a pattern predetermined for the first radio communication system.

5. The apparatus according to claim 4, wherein the allocation unit sets the signal sequences to be assigned to the frequency channels, the signal sequences having zero correlation value between two signal sequences included in the signal sequences.

6. The apparatus according to claim 4, wherein the allocation unit alternately assigns two types of signal sequences to the frequency channels.

7. The apparatus according to claim 6, wherein the allocation unit sets the signal sequences to be assigned to the frequency channels, the signal sequences having zero correlation value between two signal sequences included in the signal sequences.

8. The apparatus according to claim 4, further comprising an OFDM transmission unit configured to transmit a signal of an orthogonal frequency division multiplex system, and
 wherein the selection unit selects a plurality of subcarriers used to transmit a third frame, and
 the OFDM transmission unit transmits the third frame using the subcarriers.

9. The apparatus according to claim 3, wherein the allocation unit sets a time during which signal values included in the signal sequence are constant to be different from a symbol time of the second radio communication system.

10. A radio communication apparatus which uses a first radio communication system that makes a radio communication by sharing frequencies with a second radio communication system, the apparatus comprising:
 a detection unit configured to detect an available frequency channel which fails to be used by the second radio communication system in a frequency band used by the first radio communication system;

a first decision unit configured to decide, when the available frequency band is detected, a subcarrier used to transmit a transmission frame in the available frequency band;

an allocation unit configured to allocate, in a part of the transmission frame, a plurality of pilot symbols which are used to identify whether or not a frame is transmitted by a radio communication terminal belonging to the first radio communication system by detecting an available frequency band, the pilot symbols being predetermined for the first radio communication system and having different patterns for respective subcarriers;

an inverse Fourier transformation unit configured to inverse Fourier transform the transmission frame including the pilot symbols;

a transmission unit configured to transmit the inverse Fourier transformed transmission frame;

a receiving unit configured to receive a receiving frame from the radio communication terminal;

a synchronization unit configured to establish timing synchronization of the receiving frame to obtain a synchronized frame;

a Fourier transformation unit configured to Fourier transform the synchronized frame;

a calculation unit configured to calculate, for respective subcarriers, correlation values between the synchronized frame and all the pilot symbols;

a first selection unit configured to select, for respective subcarriers, a maximum correlation value of the correlation values;

a second selection unit configured to select a subcarrier, the maximum correlation value of which exceeds a threshold value, as an effective subcarrier candidate;

a second decision unit configured to decide, when identifiers of the pilot symbols corresponding to the effective subcarrier candidates match an identifier pattern predetermined for the first radio communication system, the effective subcarrier candidates as effective subcarriers; and a reselection unit configured to execute, when the identifiers do not match the identifier pattern, correction processing of the effective subcarrier candidates, and to reselect effective subcarrier candidates.

11. The apparatus according to claim 10, further comprising:

a first correlation calculation unit configured to calculate a first correlation value between each subcarrier signal included in the receiving frame and a first pilot symbol;

a second correlation calculation unit configured to calculate a second correlation value between each subcarrier signal included in the receiving frame and a second pilot symbol;

a first storage unit configured to select a larger correlation value of the first correlation value and the second correlation value, and to store an identifier of the pilot symbol corresponding to the selected correlation value; and a second storage unit configured to store the correlation values selected for respective subcarriers, and wherein the second selection unit compares the selected correlation values with a threshold value, and selects subcarriers having the correlation values that exceed the threshold value as effective subcarrier candidates.

12. The apparatus according to claim 11, wherein the detection unit performs carrier sense during a carrier sense period of a receiving slot, and the second selection unit determines subcarriers other than subcarriers, carriers of which are detected during the carrier sense period, as effective subcarrier candidates.

13. A method for performing a radio communication using a first radio communication system that makes a radio communication by sharing frequencies with a second radio communication system, the method comprising:

detecting an available frequency channel which fails to be used by the second radio communication system in a frequency band used by the first radio communication system; and transmitting, using the available frequency channel, a frame which includes a signal sequence which is used to identify whether or not the frame is transmitted by a radio communication apparatus belonging to the first radio communication system by detecting the available frequency channel, the signal sequence being predetermined for the first radio communication system.

14. A method for performing a radio communication using a first radio communication system that makes a radio communication by sharing frequencies with a second radio communication system, the method comprising:

receiving a frame from a radio communication terminal belonging to the first radio communication system;

controlling gain of the frame;

establishing timing synchronization of the gain-controlled frame to obtain a synchronized frame;

calculating a correlation value between the synchronized frame and a signal sequence which is used to identify whether or not the received frame is transmitted by the radio communication terminal by detecting an available frequency channel, the signal sequence being predetermined for the first radio communication system; and determining, when the correlation value exceeds a threshold value, that the received frame is transmitted by the radio communication terminal by detecting the available frequency channel.

15. A method for performing a radio communication using a first radio communication system that makes a radio communication by sharing frequencies with a second radio communication system, the method comprising:

detecting an available frequency channel which fails to be used by the second radio communication system in a frequency band used by the first radio communication system;

selecting, when the available frequency channel is detected, the available frequency channel as a transmission frequency channel used to transmit a transmission frame;

allocating, in a part of the transmission frame, a signal sequence which is used to identify whether or not a first frame is transmitted by a radio communication apparatus belonging to the first radio communication system by detecting an available frequency channel, the signal sequence being predetermined for the first radio communication system;

transmitting the allocated transmission frame using the transmission frequency channel;

receiving a second frame from the radio communication apparatus;

controlling gain of the second frame;

establishing timing synchronization of the gain-controlled frame to obtain a synchronized frame;

calculating a correlation value between the synchronized frame and the signal sequence; and determining, when the correlation value exceeds a threshold value, that the received frame is the first frame which is transmitted by the radio communication apparatus by detecting the available frequency channel.

16. A method for performing a radio communication using a first radio communication system that makes a radio communication by sharing frequencies with a second radio communication system, the method comprising:

detecting an available frequency channel which fails to be used by the second radio communication system in a frequency band used by the first radio communication system;

deciding, when the available frequency band is detected, a subcarrier used to transmit a transmission frame in the available frequency band;

allocating, in a part of the transmission frame, a plurality of pilot symbols which are used to identify whether or not a frame is transmitted by a radio communication apparatus belonging to the first radio communication system by detecting an available frequency band, the pilot symbols being predetermined for the first radio communication system and having different patterns for respective subcarriers;

inverse Fourier transforming the transmission frame including the pilot symbols;

transmitting the inverse Fourier transformed transmission frame;

receiving a receiving frame from the radio communication apparatus;

establishing timing synchronization of the receiving frame to obtain a synchronized frame;

Fourier transforming the synchronized frame;

calculating, for respective subcarriers, correlation values between the synchronized frame, the timing synchronization of which has been established, and all the pilot symbols;

selecting, for respective subcarriers, a maximum correlation value of the correlation values;

selecting a subcarrier, the maximum correlation value of which exceeds a threshold value, as an effective subcarrier candidate;

deciding, when identifiers of the pilot symbols corresponding to the effective subcarrier candidates match an identifier pattern predetermined for the first radio communication system, the effective subcarrier candidates as effective subcarriers; and executing, when the identifiers do not match the identifier pattern, correction processing of the effective subcarrier candidates, and to reselect effective subcarrier candidates.

* * * * *